(12) United States Patent
Kawana

(10) Patent No.: US 7,529,036 B2
(45) Date of Patent: May 5, 2009

(54) PROJECTION ZOOM LENS AND PROJECTION DISPLAY DEVICE

(75) Inventor: Masanao Kawana, Saitama (JP)

(73) Assignee: Fujinon Corporation, Saitama-Shi (JP)

(*) Notice: Subject to any disclaimer, the term of this patent is extended or adjusted under 35 U.S.C. 154(b) by 229 days.

(21) Appl. No.: 11/730,115

(22) Filed: Mar. 29, 2007

(65) Prior Publication Data

US 2007/0229976 A1 Oct. 4, 2007

(30) Foreign Application Priority Data

Mar. 30, 2006 (JP) ............................ P2006-094067

(51) Int. Cl.
*G02B 15/14* (2006.01)

(52) U.S. Cl. .................. 359/689; 359/679; 359/649

(58) Field of Classification Search ......... 359/680–682, 359/689, 679, 649–651
See application file for complete search history.

(56) References Cited

U.S. PATENT DOCUMENTS 5,805,350 A * 9/1998 Yamamoto .................. 359/686

| | | | |
|---|---|---|---|
| 6,888,682 B2 | 5/2005 | Kawakami | |
| 7,233,447 B2 * | 6/2007 | Baba | 359/680 |
| 2008/0151382 A1 * | 6/2008 | Kawana | 359/650 |
| 2008/0231967 A1 * | 9/2008 | Inoko | 359/676 |

FOREIGN PATENT DOCUMENTS

JP 2004-271668 A 9/2004

* cited by examiner

*Primary Examiner*—Jordan M. Schwartz
(74) *Attorney, Agent, or Firm*—Birch, Stewart, Kolasch & Birch, LLP

(57) ABSTRACT

A projection zoom lens has three negative, positive, and position group configuration in order from a magnification side. A first group $G_1$ includes a positive $L_1$, a negative meniscus lens $L_2$, a negative lens $L_3$, a positive $L_4$, and a negative lens $L_5$. The positive lens $L_4$ and the negative lens $L_5$ constitute a cemented lens. The second group $G_2$ includes a biconvex lens $L_6$ and a biconvex lens $L_7$. The third group $G_3$ includes an aspheric lens $L_8$, a negative lens $L_9$, a positive lens $L_{10}$, and a positive lens $L_{11}$. The first to third lens groups satisfy:

$$|M3/f3| < |M1/f1| < |M2/f2| \tag{1}$$

$$0.40 < |M2/f2| < 0.80 \tag{2}$$

where Mi denotes a movement amount of the i-th lens group between the wide-angle end and the telephoto end during the varying of the power, and fi denotes a focal length of the i-th lens group.

20 Claims, 37 Drawing Sheets

EXAMPLE 1

EXAMPLE 1 (WIDE)

FIG. 2
EXAMPLE 1
← MAGNIFICATION SIDE  REDUCTION SIDE →
WIDE
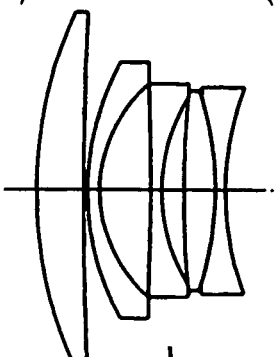 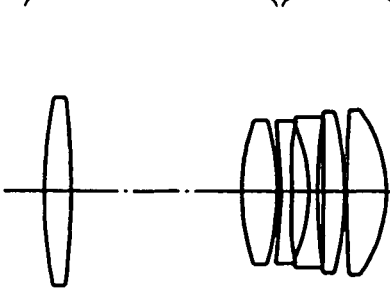 
MIDDLE
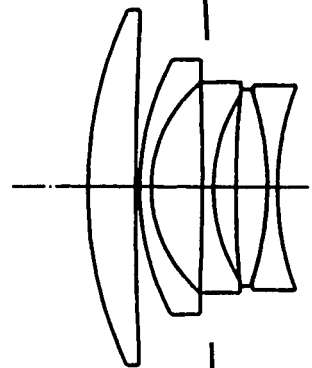  
TELE
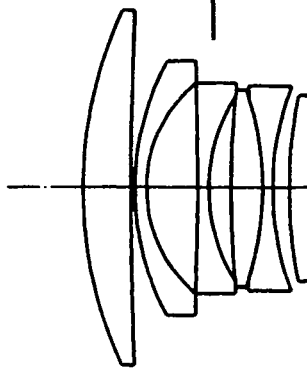  

EXAMPLE 2 (WIDE)

EXAMPLE 3 (WIDE)

EXAMPLE 4 (WIDE)

EXAMPLE 5 (WIDE)

FIG. 10
EXAMPLE 5
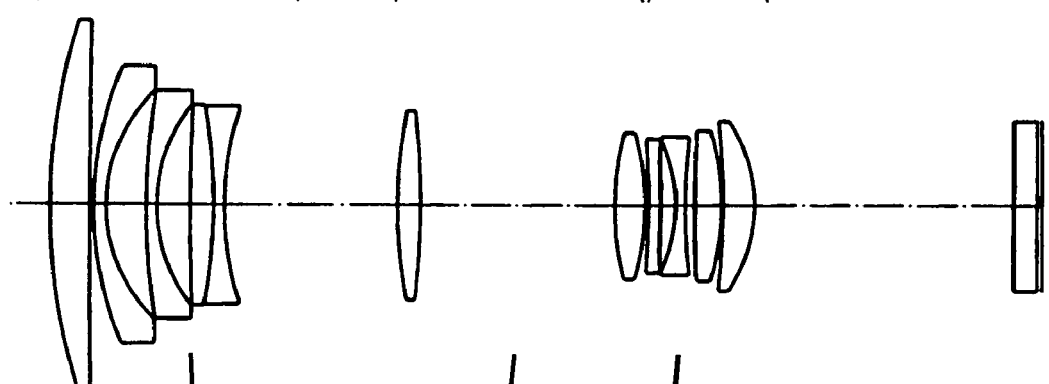
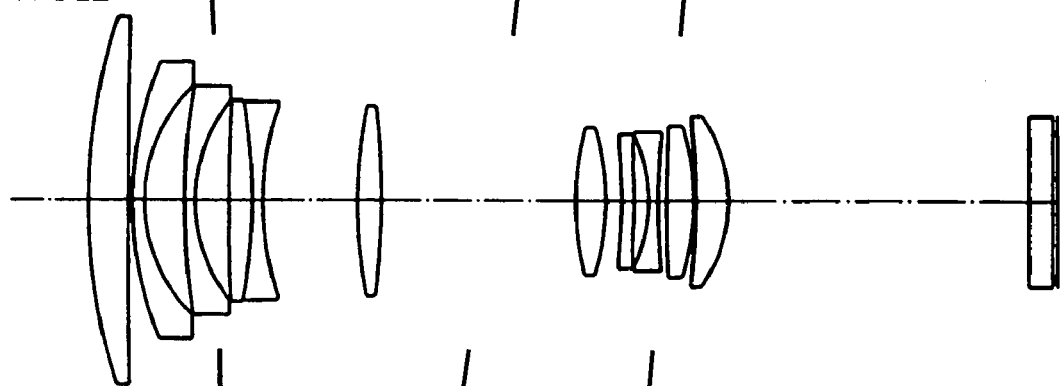
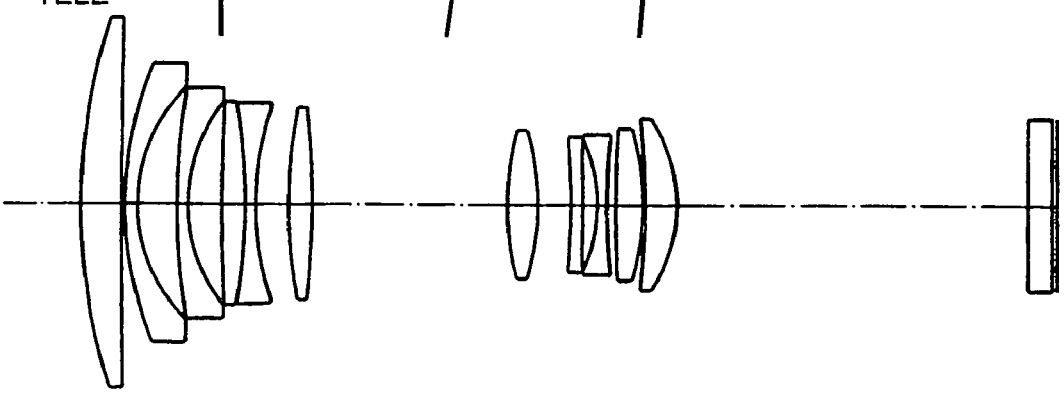

EXAMPLE 6 (WIDE)

FIG. 12
EXAMPLE 6
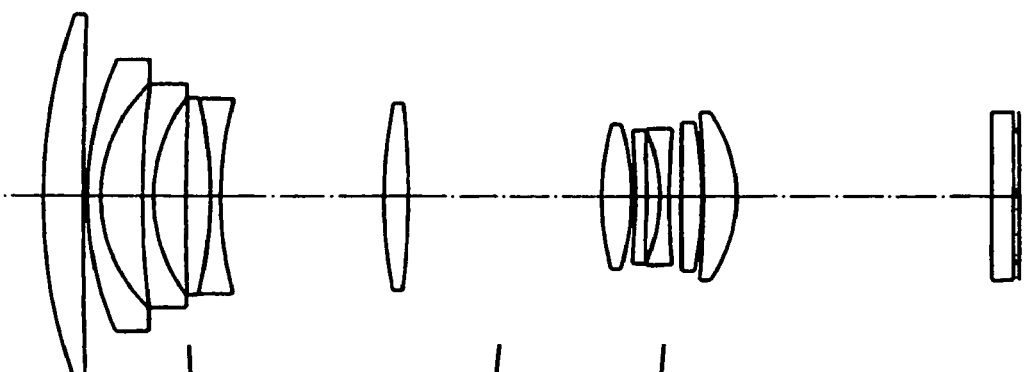
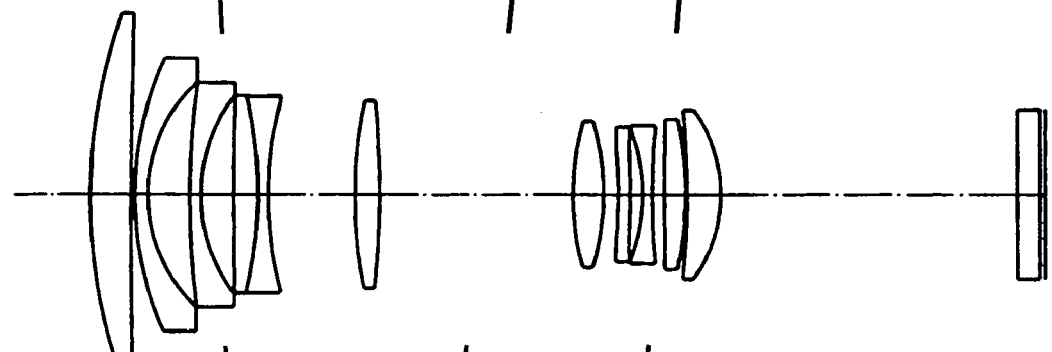
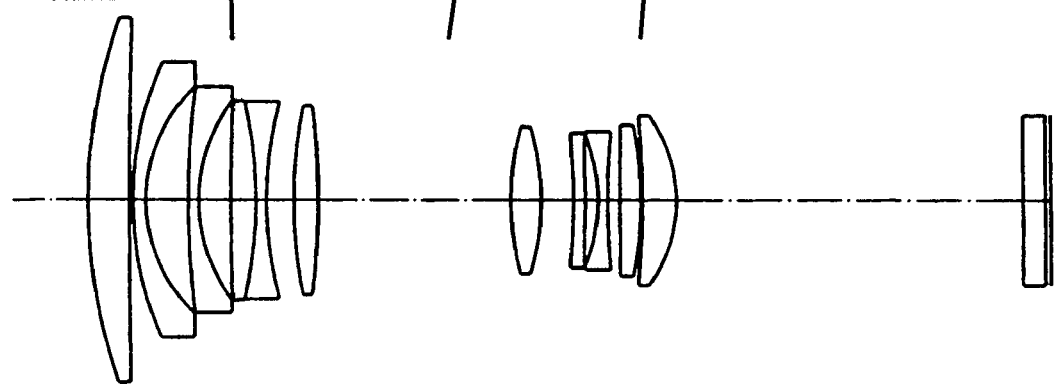

EXAMPLE 1

EXAMPLE 1

FIG. 16
EXAMPLE 1
TELE
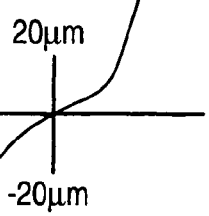 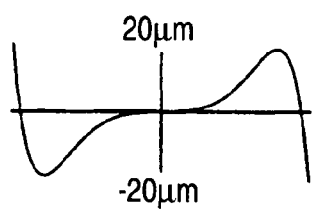
ω = 22.4°
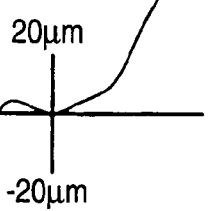 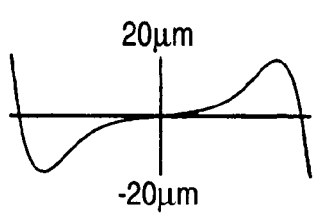
ω = 18.2°
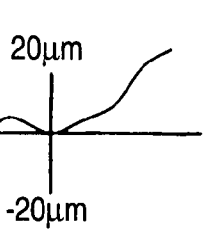 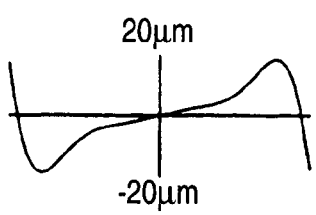
ω = 13.8°
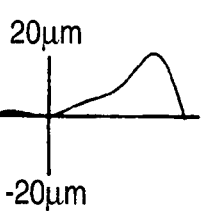 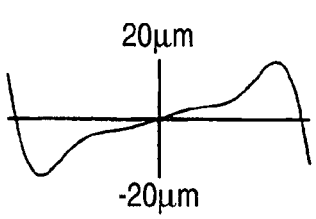
ω = 9.3°
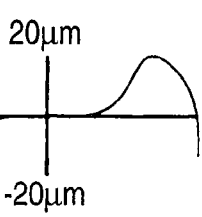
ω = 0°

FIG. 18
EXAMPLE 2
WIDE
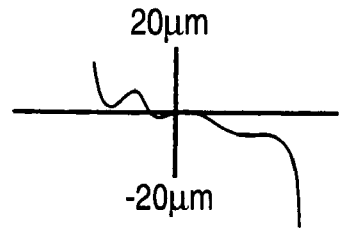 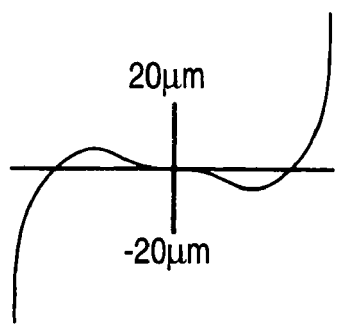
ω = 33.7°
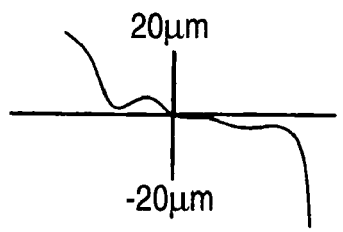 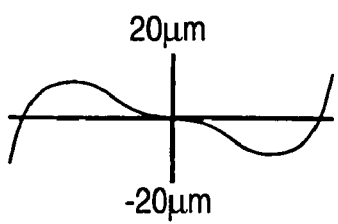
ω = 28.1°
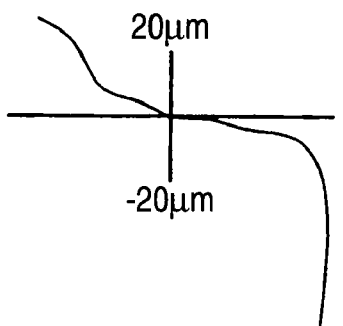 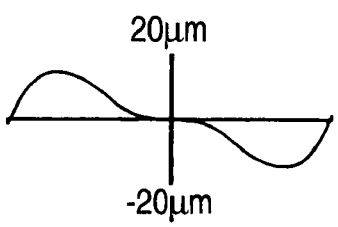
ω = 21.7°
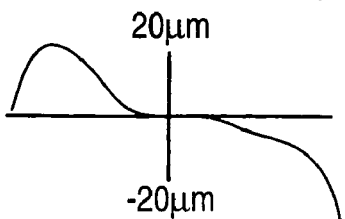 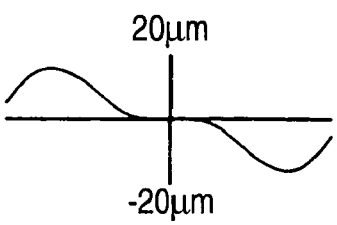
ω = 14.8°
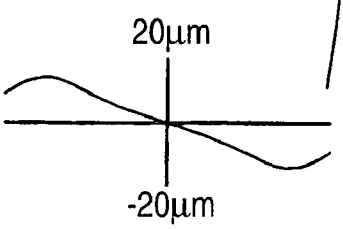
ω = 0°

EXAMPLE 2

FIG. 21
EXAMPLE 3
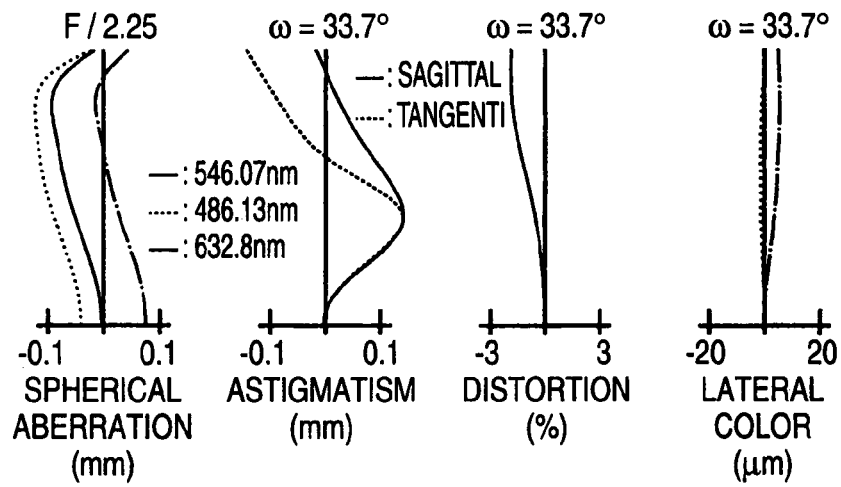
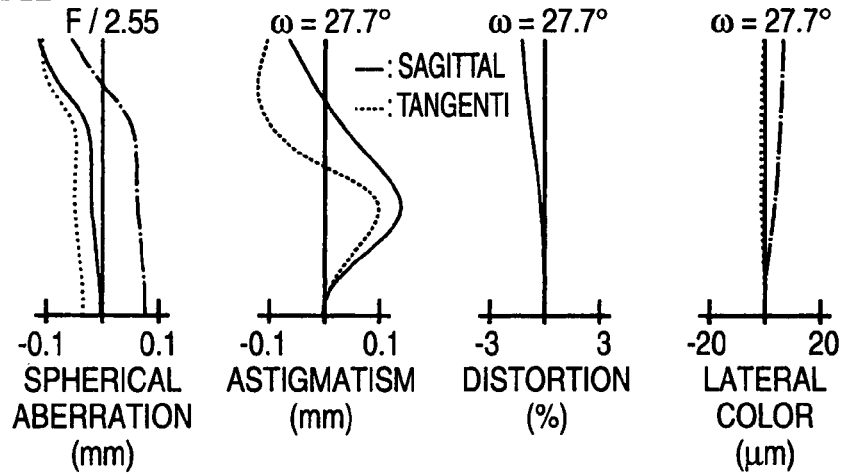
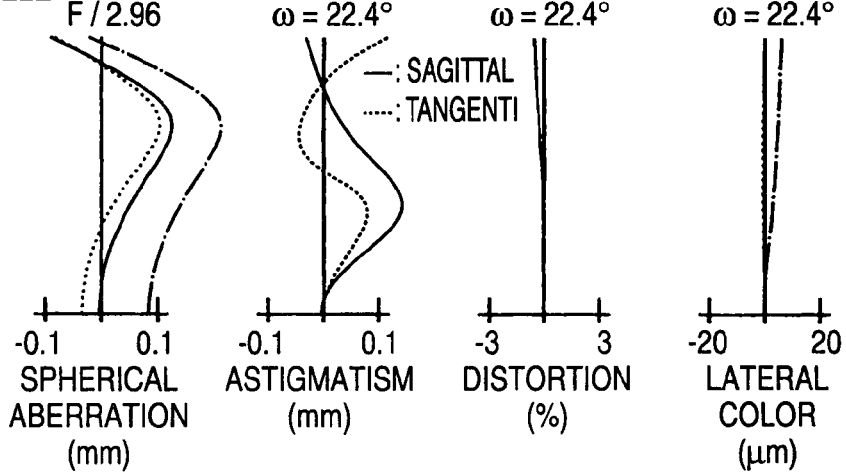

EXAMPLE 3

EXAMPLE 3

MIDDLE

EXAMPLE 3

TELE

FIG. 26
EXAMPLE 4
WIDE
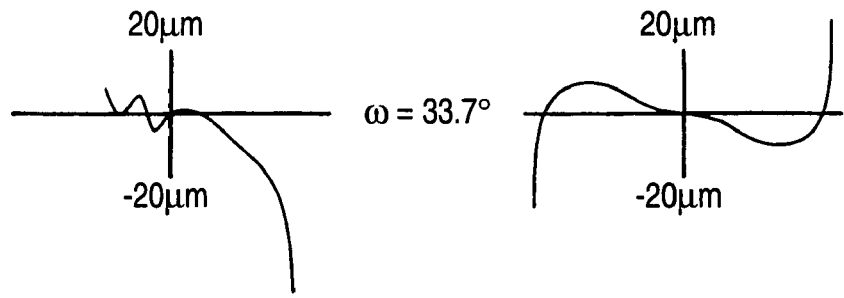# ω = 33.7°
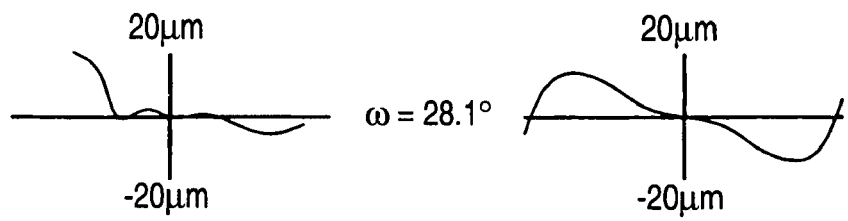# ω = 28.1°
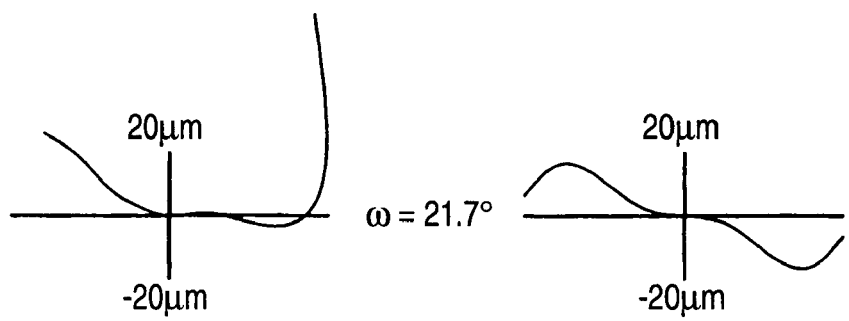# ω = 21.7°
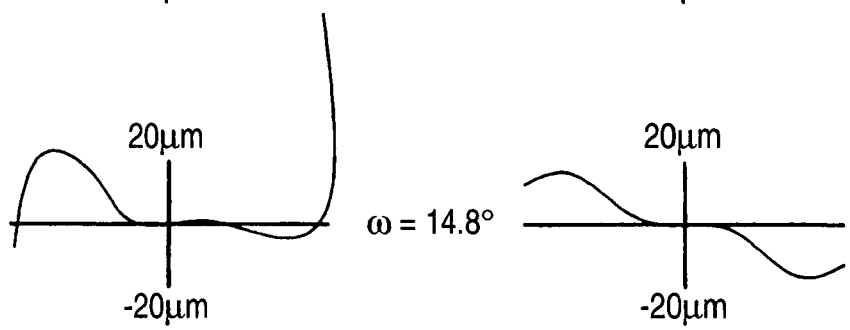# ω = 14.8°
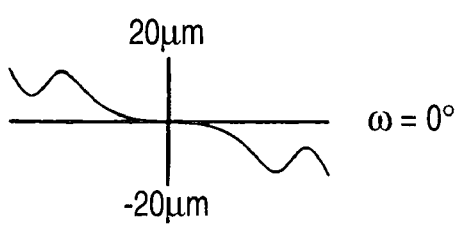# ω = 0°

FIG. 28
EXAMPLE 4
TELE
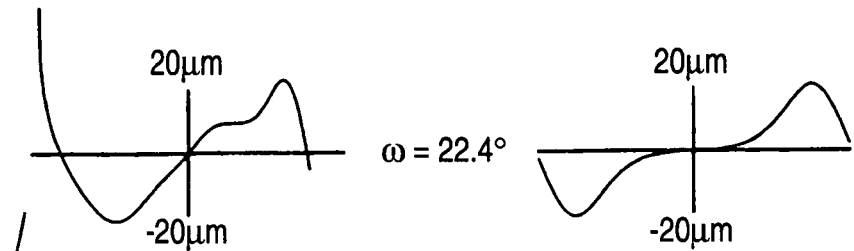
ω = 22.4°
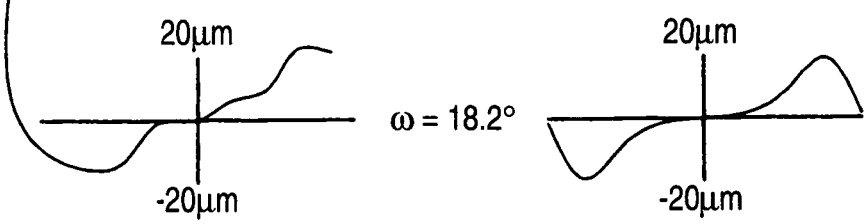
ω = 18.2°
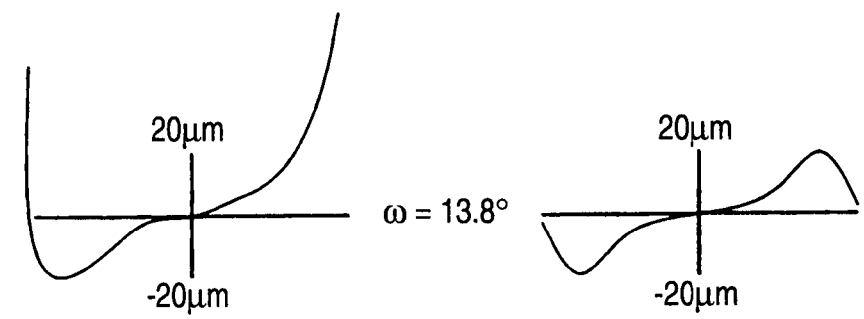
ω = 13.8°
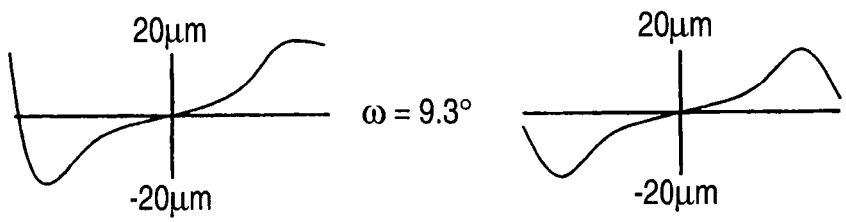
ω = 9.3°
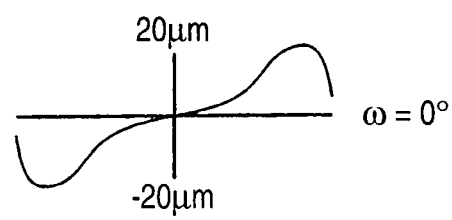
ω = 0°

FIG. 32
EXAMPLE 5
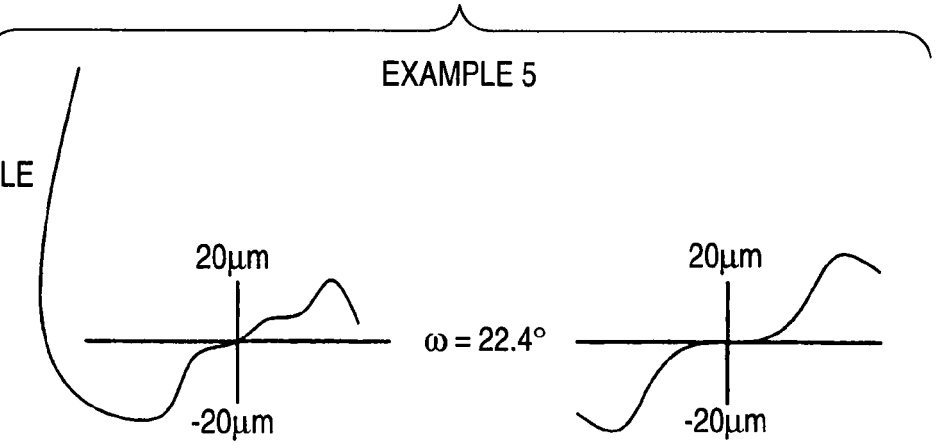
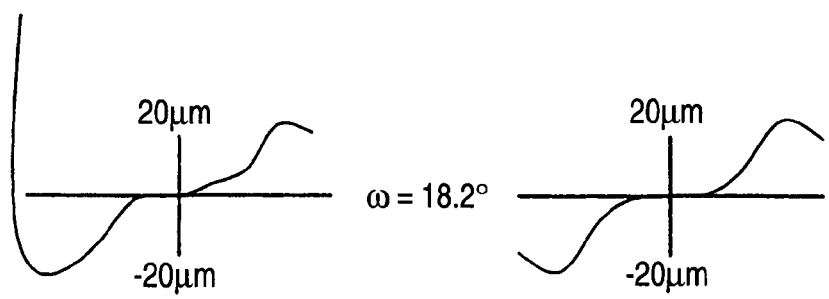
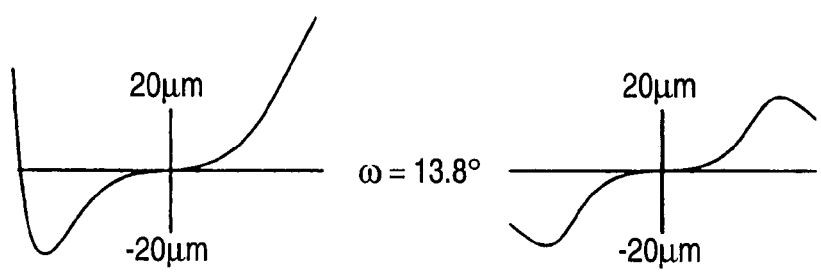
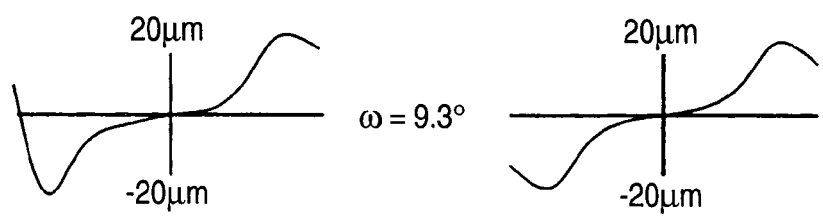
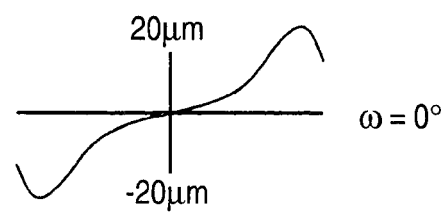

FIG. 33
EXAMPLE 6
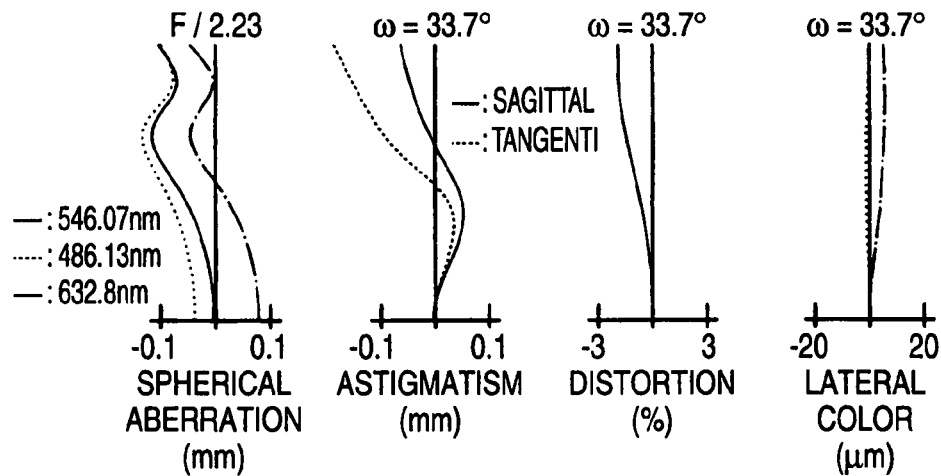
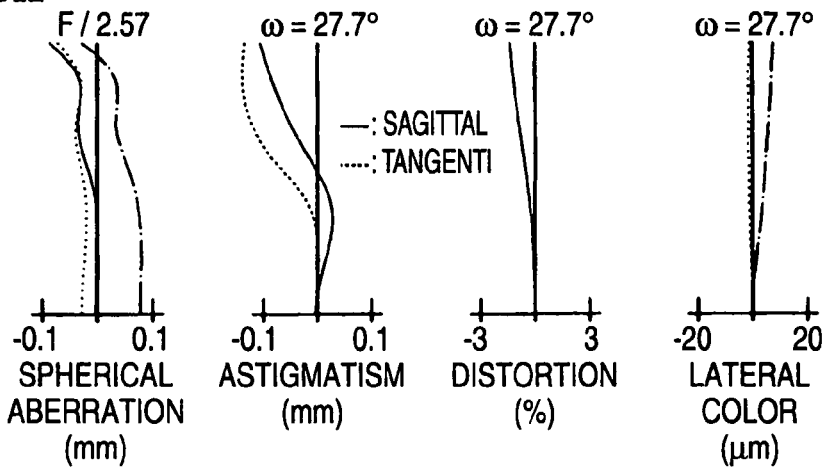
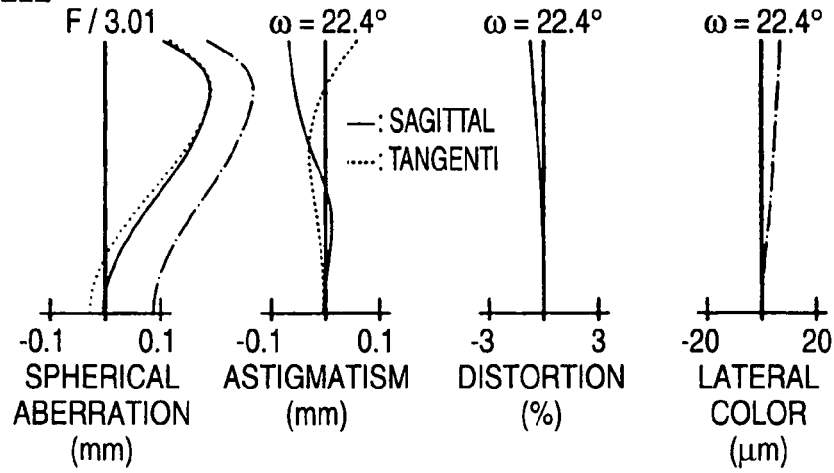

EXAMPLE 6

FIG. 35
EXAMPLE 6
MIDDLE
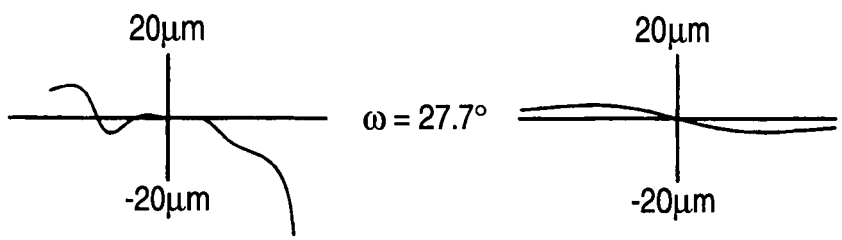 ω = 27.7°
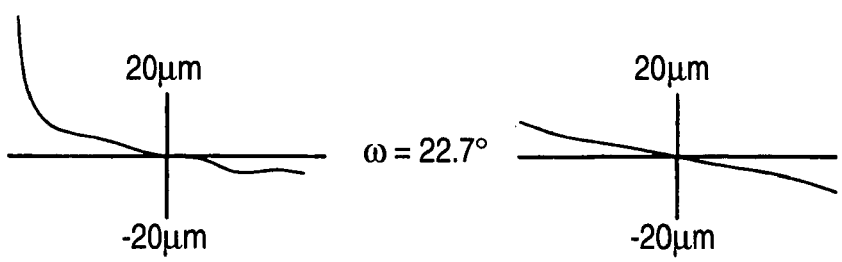 ω = 22.7°
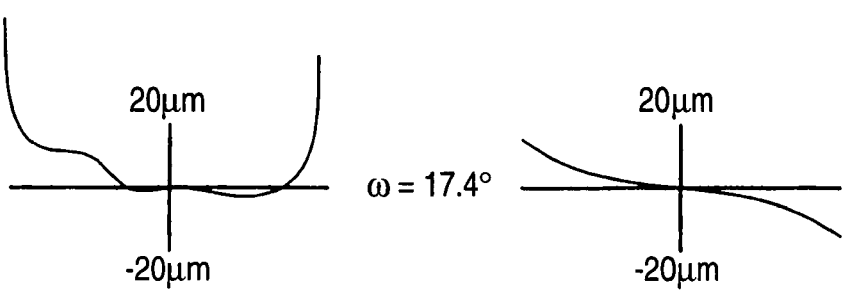 ω = 17.4°
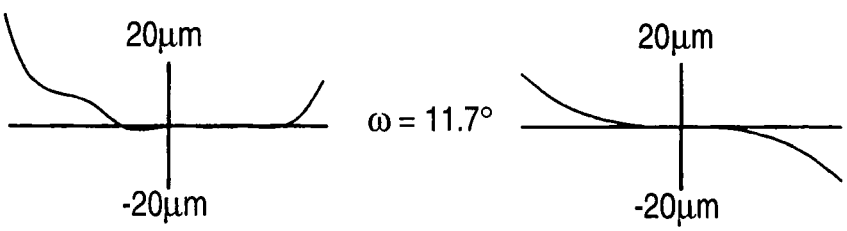 ω = 11.7°
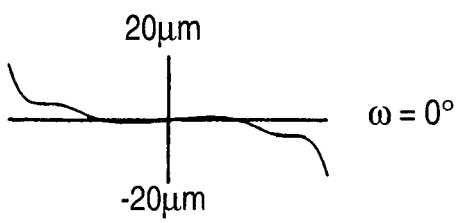 ω = 0°

FIG. 36
EXAMPLE 6
TELE
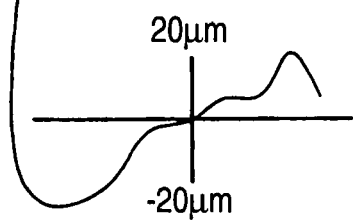 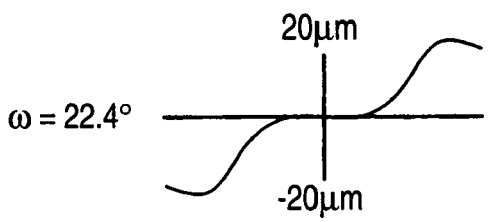
ω = 22.4°
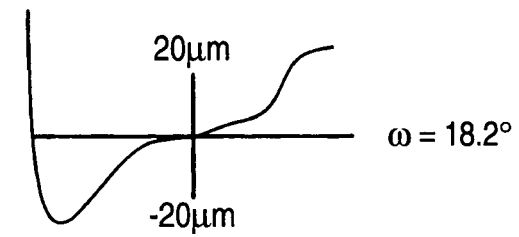 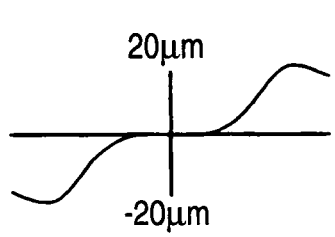
ω = 18.2°
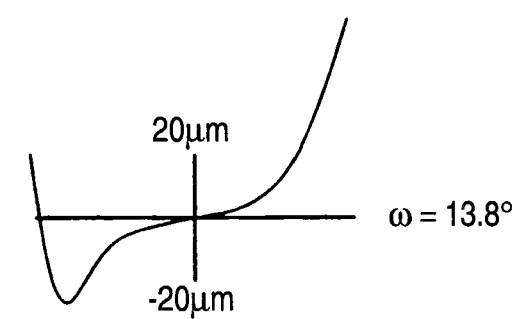 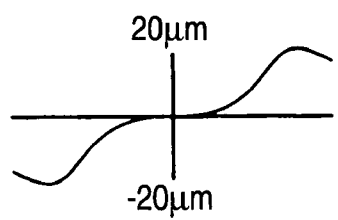
ω = 13.8°
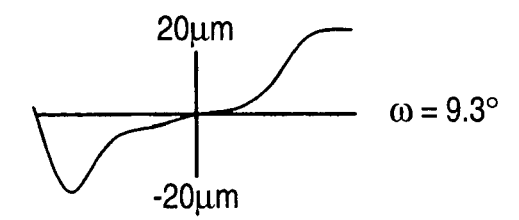 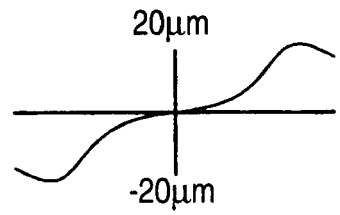
ω = 9.3°
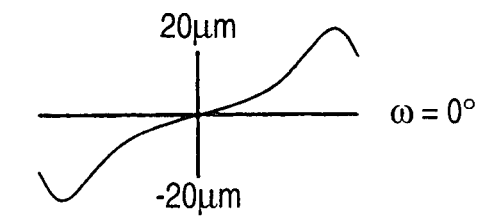
ω = 0°

PROJECTION ZOOM LENS AND PROJECTION DISPLAY DEVICE

BACKGROUND OF THE INVENTION

1. Technical Field

The invention relates to a projection zoom lens of a three-group configuration incorporated into a projection display device and a projection display device using the projection zoom lens. More particularly, the invention relates to a projection zoom lens for projecting a luminous flux that contains video information from a light valve of a DMD (digital micromirror device) display device onto a screen in an enlarged fashion and a projection display device.

2. Description of the Related Art

Much attention is now focused on a projection projector system (projection display device) using a DMD display device as the light valve.

In the DMD, a fine rectangular mirror (mirror element) which has high reflectivity and which can be inclined in a range of 10 degree or more in accordance with a video signal, on a silicon memory chip by means of the CMOS semiconductor technology. The projection projector system using the DMD can control a reflection direction of a light emitted from a light source by varying an angle of the mirror element in such a way that only a desired reflected light can be converged on a screen to project a desired video thereon.

In this DMD, for example, a few or more million mirrors are aligned in a matrix manner on a substrate so that the huge number of mirrors can be digital-controlled independently. Therefore, each mirror corresponds to one pixel in a video.

Also, since there is no need to polarize an illumination light unlike a liquid crystal display device, the loss of light is small. Also, this DMD is excellent in the accuracy of a gradation representation.

Meanwhile, in the projection projector system using the DMD, the illumination system is configured without the prism, which is used for color synthesis and separation of illumination light/projection light, being disposed on a reduction side of the projection lens. That is, the so-called single board time-division system is often employed. In this case, a space in which the prism is arranged can be omitted and also there is no need to construct the reduction side of the projection lens as the telecentric system. Therefore, it is required that a further reduction in size of the lens should be achieved by setting eye on the reduction side in a position close to the panel. In addition, a high picture quality that conforms to a resolution of the device is demanded. In this case, a wider angel of view and a zooming with a high zoom ratio are needed from a viewpoint of the installation performance.

JP 2004-271668 A (corresponding to U.S. Pat. No. 6,888, 682) discloses a zoom lens system, which has wider angle of view/high zoom ratio and can satisfy such requests to some extent.

However, in the technology disclosed in JP 2004-271668 A, the optical performances are satisfactorily maintained by using plural aspheric lenses, as apparent from the description of the respective embodiments. As a result, a too heavy burden is laid on the processing and assembling of lenses and increase in production cost is caused. In other words, it can be said that JP 2004-271668 A can maintain the optical performances satisfactorily only when using plural aspheric lenses.

Also, the demand for the lateral color becomes severe more and more to satisfy the higher definition of the imaging device. The zoom lens system disclosed in JP 2004-271668 A leaves room for improvement as to the lateral color.

SUMMARY OF THE INVENTION

The invention has been made in view of the above circumstances, and provides a projection zoom lens and a projection display device which can achieve a wide angle of view and a high variable power ratio, which can correct for respective aberrations including a lateral color satisfactorily without plural aspheric lenses, and which are suitable for the compact projection projector system using the DMD.

According to an aspect of the invention, a projection zoom lens includes in order from a magnification side, a first lens group having a negative refractive power, a second lens group having a positive refractive power, and a third lens group for an aberration correction. All the first to third lens groups are configured to be moving groups, respectively. The second lens group and the third lens group are configured to move to the magnification side during varying of a power of the zoom lens from a wide-angle end to a telephoto end. The first to third lens groups satisfy:

$$|M3/f3|<|M1/f1|<|M2/f2| \tag{1}$$

$$0.40<|M2/f2|<0.80 \tag{2}$$

where Mi denotes a movement amount of the i-th lens group between the wide-angle end and the telephoto end during the varying of the power, and fi denotes a focal length of the i-th lens group.

Also, the second lens group may includes two or more positive lenses. A refractive index Npd of a glass material constituting the positive lens disposed on a most magnification side among the two or more positive lenses with respect to d-line satisfies:

$$Npd>1.70 \tag{3}$$

Also, an Abbe number vpd of the glass material constituting the positive lens on the most magnification side among the two or more positive lenses with respect to the d-line may satisfy:

$$vpd>40 \tag{4}$$

Also, the third lens group may include at least one negative lens. A refractive index Npd of a glass material, which constitutes the negative lens having the largest refractive power among the at least one negative lens, with respect to d-line satisfies:

$$Nnd>1.75 \tag{5}$$

Also, a lens, which is disposed on a most reduction side of the third lens group, may be a positive lens whose convex surface is directed to the reduction side.

Also, at least one surface of one of the lenses of the third lens group may be formed of an aspheric surface.

According to another aspect of the invention, a projection display device includes a light source, a light valve, an illumination optical portion and any one of the projection zoom lenses set forth above. The illumination optical portion guides a luminous flux from the light source to the light valve. The light valve optically modulates the luminous flux from the light source. The projection zoom lens projects the modulated luminous flux onto a screen.

As described above, according to the projection zoom lens and the projection display device of the invention, the zoom lens system has the three-group configuration and also the power and the power varying function are allocated appropriately to respective groups by satisfying the predetermined conditional expressions. Therefore, the wide-angle zoom lens, which can improve the balance of aberrations satisfactorily even though plural aspheric lenses are not used, which can achieve the zoom ratio of almost 1.5 times or more and the brightness of almost F 2.08 to 2.20 at the wide-angle end, can be provided. Also, the projection display device using the same can be obtained.

Also, because the predetermined conditional expressions are satisfied, various aberrations can be improved further satisfactorily while advancing further reduction in size. In particular, the lateral color can be improved satisfactorily.

BRIEF DESCRIPTION OF THE DRAWINGS

FIG. 2 is a schematic view showing a lens moving locus in the projection zoom lens according to the example 1 during varying of a power of the projection zoom lens.

FIG. 10 is a schematic view showing a lens moving locus in the projection zoom lens according to the example 5 during the varying of the power.

FIG. 12 is a schematic view showing a lens moving locus in the projection zoom lens according to the example 6 during the varying of the power.

FIG. 16 is a chart of transverse aberrations of the projection zoom lens of the example 1 at the wavelength of 546.07 nm at a telephoto end.

FIG. 18 is a chart of transverse aberrations of the projection zoom lens of the example 2 at the wavelength of 546.07 nm at a wide-angle end.

FIG. 21 is an aberration chart showing various aberrations (spherical aberration, astigmatism, distortion, and lateral color) of the projection zoom lens of the example 3.

FIG. 26 is a chart of transverse aberrations of the projection zoom lens of the example 4 at the wavelength of 546.07 nm at a wide-angle end.

FIG. 28 is a chart of transverse aberrations of the projection zoom lens of the example 4 at the wavelength of 546.07 nm at a telephoto end.

FIG. 32 is a chart of transverse aberrations of the projection zoom lens of the example 5 at the wavelength of 546.07 nm at a telephoto end.

FIG. 33 is an aberration chart showing various aberrations (spherical aberration, astigmatism, distortion, and lateral color) of the projection zoom lens of the example 6.

FIG. 35 is a chart of transverse aberrations of the projection zoom lens of the example 6 at the wavelength of 546.07 nm in a middle range.

FIG. 36 is a chart of transverse aberrations of the projection zoom lens of the example 6 at the wavelength of 546.07 nm at a telephoto end.

DETAILED DESCRIPTION OF EMBODIMENTS OF THE INVENTION

Figure 1:
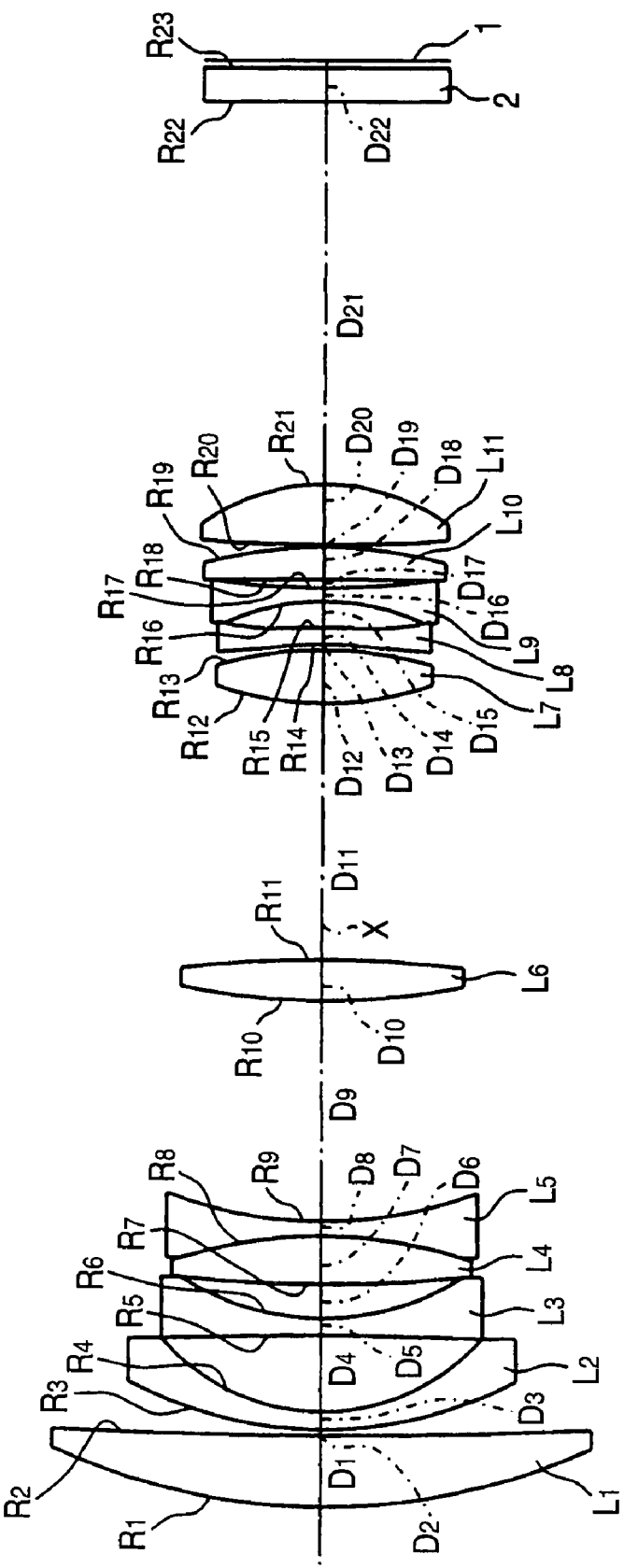
FIG. 1 is a schematic view showing a configuration of a projection zoom lens according to an example 1 of the invention.

Exemplary embodiments of the invention will be described with reference to the accompanying drawings hereinafter. A projection zoom lens according to an embodiment shown in FIG. 1 (FIG. 1. shows a configuration of an example 1 at the wide-angle end as a representative) is configured to include sequentially a first lens group $G_1$ having a negative refractive power, a second lens group $G_2$ having a positive refractive power, and a third lens group $G_3$ having a positive or negative refractive power to correct the aberration, from the magnification side. A cover glass (filter portion) 2 and a DMD 1 are provided at the rear stage of the zoom lens. Here, "X" in FIG. 1 represents an optical axis.

The first lens group $G_1$ includes a first lens $L_1$ made of a positive lens, a second lens $L_2$ made of a negative meniscus lens whose convex surface is directed to the magnification side, a third lens $L_3$ made of a negative lens, a fourth lens $L_4$ made of a positive lens, and a fifth lens $L_5$ made of a negative lens, in order from the magnification side.

Here, the fourth lens $L_4$ and the fifth lens $L_5$ are cemented mutually so that a cemented lens is constructed. Thereby, optical adjustment (alignment adjustment) is facilitated, and also the chromatic aberration can be corrected satisfactorily.

Also, the second lens group $G_2$ includes a sixth lens $L_6$ and a seventh lens $L_7$, which are made of biconvex lenses, respectively.

Also, the third lens group $G_3$ includes an eighth lens $L_8$ made of an aspheric lens both surfaces of which are formed of an aspheric surface, a ninth lens $L_9$ made of a negative lens, a tenth lens $L_{10}$ made of a positive lens, and an eleventh lens $L_{11}$ made of a positive lens, in order from the magnification side.

It is noted that the respective lenses of the lens groups are not limited to the above shapes. Also, one or more the negative lenses and the positive lenses may be increased or decreased As described above, in this embodiment, since only single aspheric lens is provided, a reduction in production cost can be achieved in comparison with JP 2004-271668 A, which uses the plural aspheric lenses.

Here, the respective aspheric surfaces of the eighth lens $L_8$ can be expressed by the following aspheric formula:

$$Z = \frac{\frac{Y^2}{R}}{1 + \sqrt{1 - \frac{K \times Y^2}{R^2}}} + \sum_{i=3}^{11} A_i Y^i$$

Where
  Z: a length of a perpendicular from a point on an aspheric surface at a distance Y from an optical axis to a tangent plane (a plane perpendicular to the optical axis) of an aspheric vertex
  Y: a distance from the optical axis
  R: a radius of curvature of the aspheric surface near the optical axis
  K: eccentricity
  $A_i$: aspheric coefficient (i=3 to 11)

Also, in the projection zoom lens of this embodiment, the three lens groups $G_1$ to $G_3$ are configured to be moving groups, respectively. Both the second lens group $G_2$ and the third lens group $G_3$ are configured to move to the magnification side during the varying of a power of the zoom lens from the wide-angle end to the telephoto end.

Also, the projection zoom lens according to this embodiment is configured to satisfy conditional expressions (1) to (5) given in the following.

$|M3/f3| < |M1/f1| < |M2/f2|$ (1)

$0.40 < |M2/f2| < 0.80$ (2)

$Npd > 1.70$ (3)

$vpd > 40$ (4)

$Nnd > 1.75$ (5)

Where
  Mi denotes a movement amount of the i-th lens group between the wide-angle end and the telephoto end during the varying of the power,
  fi denotes a focal length of the i-th lens group,
  Npd denotes a refractive index of the glass material constituting the positive lens on the most magnification side among the positive lenses of the second lens group $G_2$ with respect to d-line,
  vpd denotes an Abbe number of the glass material constituting the positive lens on the most magnification side among the positive lenses of the second lens group $G_2$ with respect to d-line, and
  Nnd denotes a refractive index of the glass material constituting the negative lens, which has the largest refractive power among the negative lenses of the third lens group $G_3$, with respect to d-line.

Here, the technical meanings of the conditional expressions (1) to (5) will be described below.

First, the conditional expression (1) defines a magnitude relationship among the respective lens groups in terms of the products of the movement amount between the wide-angle end and the telephoto end and the power. The conditional expression (1) is set to appropriately allocate variable power at the time of zooming to the respective lens groups. In other words, these magnitudes are set so that the second lens group $G_2$ has the largest value, the first lens group $G_1$ has the next largest value, and the third lens group $G_3$ for correcting the aberration has the smallest value. Thereby, the variable power at the time of zooming is appropriately allocated to the respective lens groups. Since the first to third lens groups $G_1$ to $G_3$ satisfy the conditional expression (1), the high variable power ratio can be achieved and a variation in aberration following upon the zooming can be corrected satisfactorily.

Also, the conditional expression (2) defines a range of the product, of the second lens group $G_2$, of (i) the movement amount between the wide-angle end and the telephoto end and (ii) the power, the second lens group $G_2$ taking the largest product among the first to third lens group $G_1$ to $G_3$. Since this value of the second lens group $G_2$ is set within the range defined by the conditional expression (2), the variable power at the time of zooming can be can be allocated appropriately. When this value departs from this range, it is difficult to achieve the high variable power ratio and correct a variation in aberration following upon the zooming.

Also, the conditional expression (3) defines the refractive index Npd of the glass material constituting the positive lens on the most magnification side out of the positive lenses of the second lens group $G_2$ with respect to d-line. When this refractive index falls below the lower limit, it is difficult to correct the image plane.

Also, the conditional expression (4) defines the Abbe number vpd of the glass material constituting the positive lens on the most magnification side among the positive lenses of the second lens group $G_2$ with respect to d-line. If this Abbe number falls below the lower limit, it is difficult to correct the lateral color.

Also, the conditional expression (5) defines the refractive index Nnd of the glass material constituting the negative lens, which has the largest refractive power (absolute value) among the negative lenses of the third lens group $G_3$, with respect to d-line. If this refractive index falls below the lower limit, it is difficult to correct the spherical aberration and the chromatic aberration.

When the projection zoom lens is configured to satisfy the following conditional expression (2') instead of the conditional expression (2), allocation of the variable power to the respective lens groups at the time of varying the power can be set more appropriately.

$$0.45 < |M2/f2| < 0.65 \quad (2')$$

Figure 37:
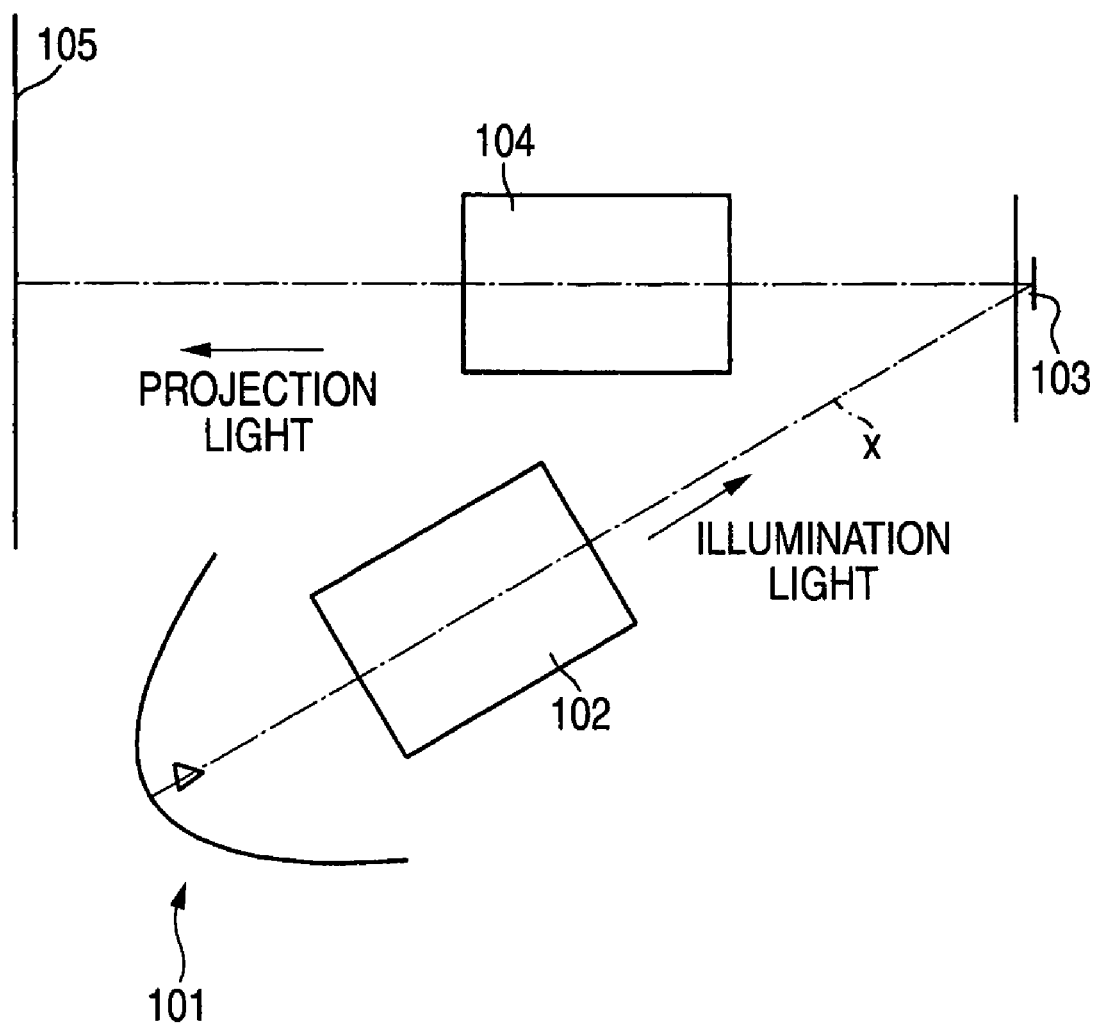
FIG. 37 is a schematic configurative view of a projection display device according to an embodiment of the invention.

Next, a projection display device according to an embodiment of the invention will be described briefly hereunder. FIG. 37 is a schematic configurative view of a projection display device according to this embodiment.

As shown in FIG. 37, a luminous flux emitted from a light source 101 passes through a rod integrator 102 that uniformizes a quantity-of-light distribution of the luminous flux in a section perpendicular to the optical axis X. Then, the luminous flux is converted selectively into three primary color lights (R,G,B) in time series by a color wheel (not shown), and then irradiated onto a DMD 103. In this DMD 103, the modulation for each color light is switched in response to the switching of color of an incident light. The projection light modulated appropriately by the DMD 103 is incident on a projection zoom lens 104 and arrives at a screen 105 finally.

EXAMPLES

The projection zoom lens according to the embodiment of the invention will be further described with reference to specific examples.

Example 1

FIG. 1 shows a schematic configuration of a projection zoom lens according to an example 1. This projection zoom lens is configured to include the first lens group $G_1$ having a negative refractive power, the second lens group $G_2$ having a positive refractive power, and the third lens group $G_3$ for the aberration correction, in order from the magnification side.

The first lens group $G_1$ includes the first lens $L_1$ made of a positive meniscus lens whose convex surface is directed to the magnification side, the second lens $L_2$ made of a negative meniscus lens whose convex surface is directed to the magnification side, the third lens $L_3$ made of a biconcave lens, the fourth lens $L_4$ made of a biconvex lens, and the fifth lens $L_5$ made of a biconcave lens, in order from the magnification side. The fourth lens $L_4$ and the fifth lens $L_5$ are cemented to each other.

Also, the second lens group $G_2$ includes the sixth lens $L_6$ and the seventh lens $L_7$, which are made of biconvex lenses, respectively.

Also, the third lens group $G_3$ includes the eighth lens $L_8$, which is made of an aspheric lens both surface of which are formed of the aspheric surface and which has a negative refractive power near the optical axis, the ninth lens $L_9$ made of a biconcave lens, the tenth lens $L_{10}$ made of a positive meniscus lens whose convex surface is directed to the reduction side, and the eleventh lens $L_{11}$ made of a biconvex lens, in order from the magnification side.

Values of the radius of curvature R (mm) of the respective lens surfaces of this projection zoom lens, center thicknesses of the respective lenses and air distances (referred to as "longitudinal surface distances" as a general name hereinafter) D (mm) between the respective lenses, and the refractive indices N of the respective lenses with respect to d-line and the Abbe numbers vd of the respective lenses with respect to d-line are given in a table 1. Here, surface numbers in Table 1 represent the order from the magnification side (the same rule applies to following Tables 2 to 6). Also, values of a focal length f (mm), a back focus Bfw (mm), FNo, and an angle of view $2\omega$ (degree) are given at the upper portion of Table 1.

Also, respective constants K, $A_3$, $A_4$, $A_5$, $A_6$, $A_7$, $A_8$, $A_9$, $A_{10}$, $A_{11}$ of the aspheric surface shown in the aspheric formula are given at the lower portion of Table 1.

In the numerical values in Table 1, three numerical values written stepwise indicate that a value at the left end denotes a value at the wide-angle end, a value in the middle denotes a value in the middle range, and a value at the right end denotes a value at the telephoto end (the same rule applies to Tables 2 to 6).

TABLE 1 f = 16.76~21.18~26.74
Bfw = 36.01
Fno = 2.08~2.31~2.69
2ω = 67.4°~55.4°~44.8°

| Surface | R | D | Nd | vd |
|---|---|---|---|---|
| 1 | 56.854 | 6.31 | 1.51680 | 64.2 |
| 2 | 525.655 | 0.50 | | |
| 3 | 35.695 | 1.60 | 1.62041 | 60.3 |
| 4 | 18.613 | 6.79 | | |
| 5 | −369.167 | 1.46 | 1.74950 | 35.0 |
| 6 | 23.676 | 2.94 | | |
| 7 | 126.950 | 4.21 | 1.80518 | 25.4 |
| 8 | −41.969 | 1.31 | 1.60311 | 60.7 |
| 9 | 38.262 | 19.57~9.83~2.21 | | |
| 10 | 62.340 | 3.63 | 1.77250 | 49.6 |
| 11 | −111.023 | 22.73 | | |
| 12 | 29.991 | 4.69 | 1.58913 | 61.3 |
| 13 | −35.300 | 0.50~1.76~3.90 | | |
| *14 | −25.787 | 1.50 | 1.68893 | 31.1 |
| *15 | −48.559 | 2.31 | | |
| 16 | −21.568 | 1.20 | 1.80610 | 33.3 |
| 17 | 70.507 | 0.78 | | |
| 18 | −797.789 | 2.91 | 1.56883 | 56.0 |
| 19 | −40.313 | 0.20 | | |
| 20 | 151.740 | 5.34 | 1.62299 | 58.2 |
| 21 | −19.014 | 33.50~38.89~44.87 | | |
| 22 | ∞ | 3.00 | 1.48749 | 70.2 |
| | ∞ | | | |

*Aspheric surface coefficient

| | Surface number | |
|---|---|---|
| | 14 | 15 |
| K | −34.4308247 | −461.9192592 |
| $A_3$ | $1.7815970 \times 10^{-3}$ | $1.6092469 \times 10^{-3}$ |
| $A_4$ | $-1.2370595 \times 10^{-3}$ | $-1.3607082 \times 10^{-3}$ |
| $A_5$ | $4.0232455 \times 10^{-4}$ | $4.4927065 \times 10^{-4}$ |
| $A_6$ | $-5.4347210 \times 10^{-5}$ | $-5.0601320 \times 10^{-5}$ |
| $A_7$ | $1.5845647 \times 10^{-6}$ | $4.4295824 \times 10^{-8}$ |
| $A_8$ | $3.3483656 \times 10^{-7}$ | $2.9155911 \times 10^{-7}$ |
| $A_9$ | $-2.6066787 \times 10^{-8}$ | $1.7407963 \times 10^{-8}$ |
| $A_{10}$ | $-5.8327006 \times 10^{-10}$ | $-5.0695225 \times 10^{-9}$ |
| $A_{11}$ | $7.6380981 \times 10^{-11}$ | $2.2420346 \times 10^{-10}$ |

Also, the projection zoom lens of the example 1, satisfies all the conditional expressions (1) to (5) and te conditional expression (2') as shown in a table 7.

Also, FIG. 2 shows a lens moving locus in the projection zoom lens according to the example 1 during the varying of the power.

Figure 13:
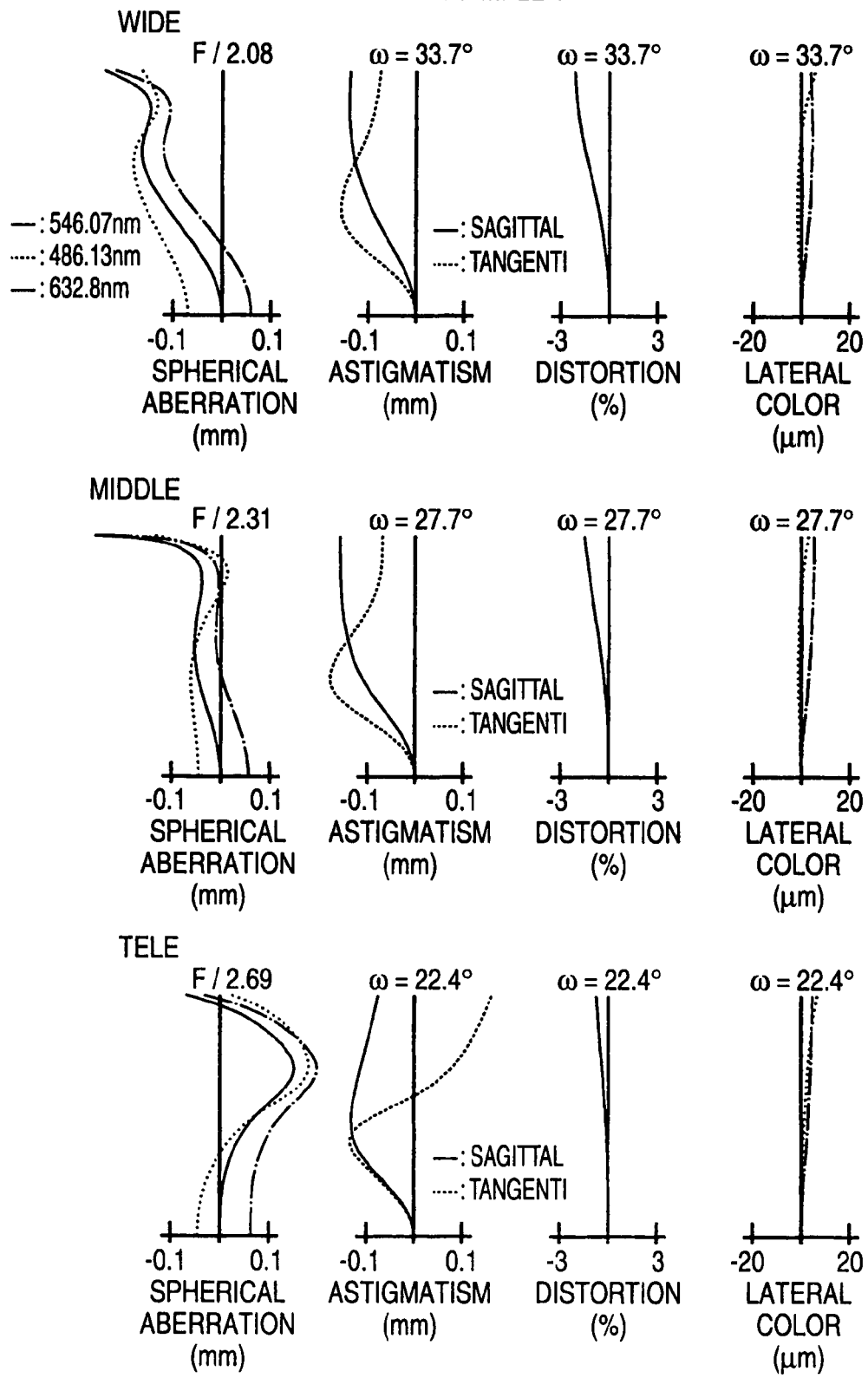
FIG. 13 is an aberration chart showing various aberrations (spherical aberration, astigmatism, distortion, and lateral color) of the projection zoom lens of the example 1.

In addition, FIG. 13 is an aberration chart showing the spherical aberration, the astigmatism, the distortion, and the lateral color of the projection zoom lens of the example 1. Here, the aberrations as to the sagittal image surface and the tangential image surface are shown in the astigmatism chart.

Figure 14:
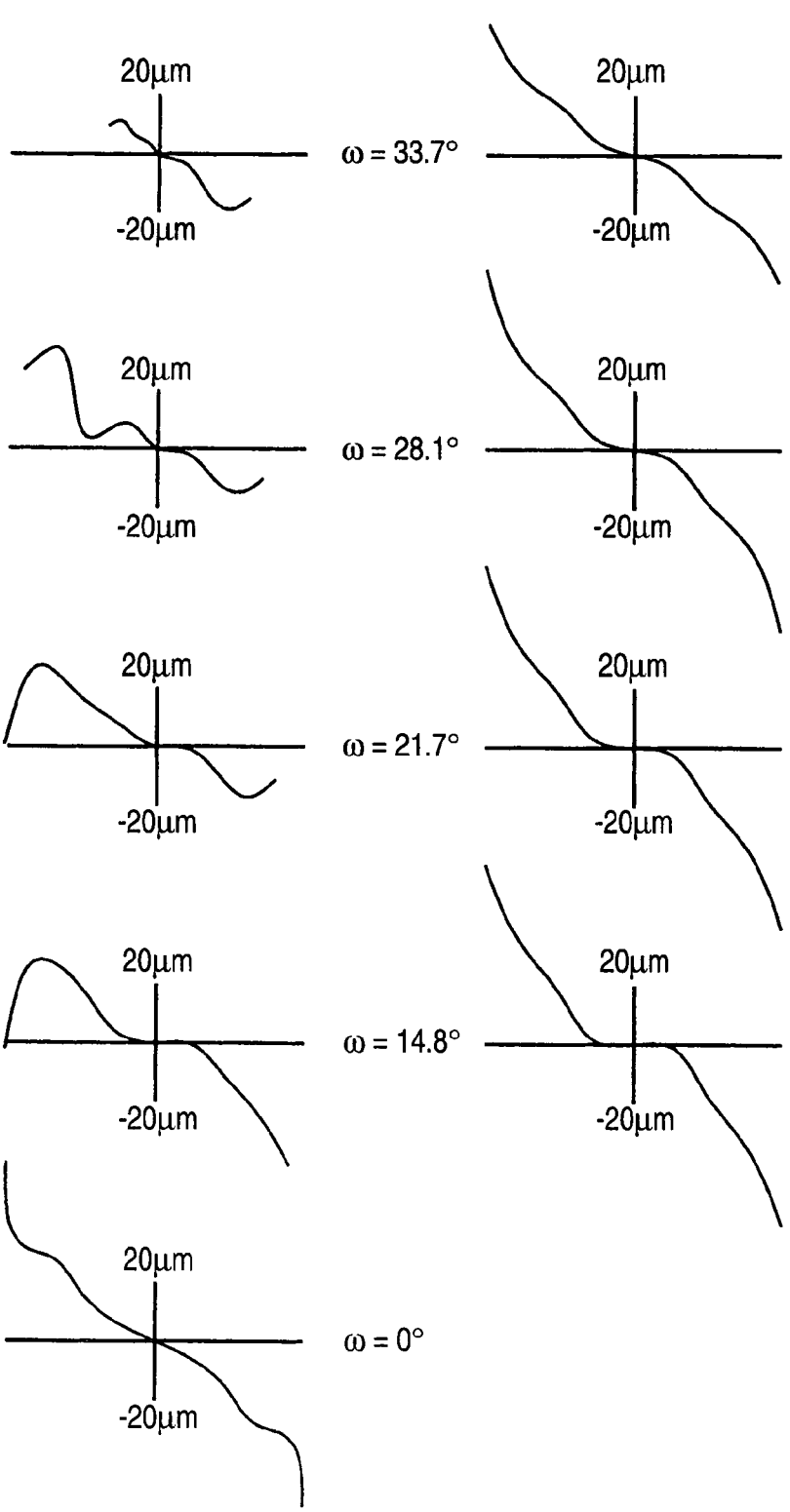
FIG. 14 is a chart of transverse aberrations of the projection zoom lens of the example 1 at a wavelength of 546.07 nm at a wide-angle end.
Figure 15:
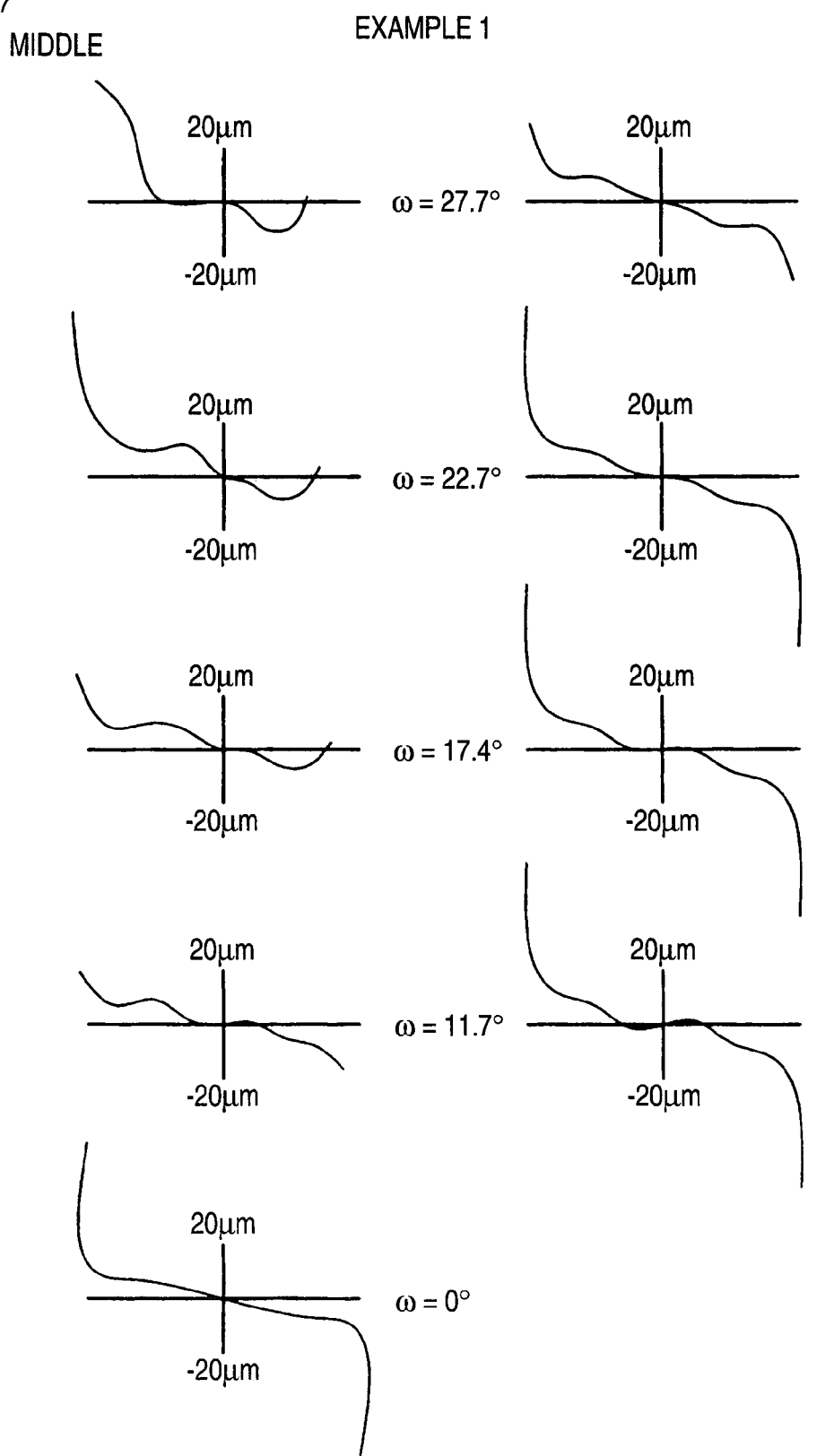
FIG. 15 is a chart of transverse aberrations of the projection zoom lens of the example 1 at the wavelength of 546.07 nm in a middle range.

Also, FIG. 14 to FIG. 16 are transverse aberration charts at a wavelength of 546.07 nm at the wide-angle end, in the middle range, and at the telephoto end in Table 1, respectively.

As apparent from these aberration charts, the projection zoom lens of the example 1 can correct the respective aberrations, especially the lateral color satisfactorily.

Also, the projection zoom lens of the example 1 can improve the variable power ratio up to almost 1.59 times close to 1.6 times while maintaining the good optical performance.

Example 2

Figure 3:
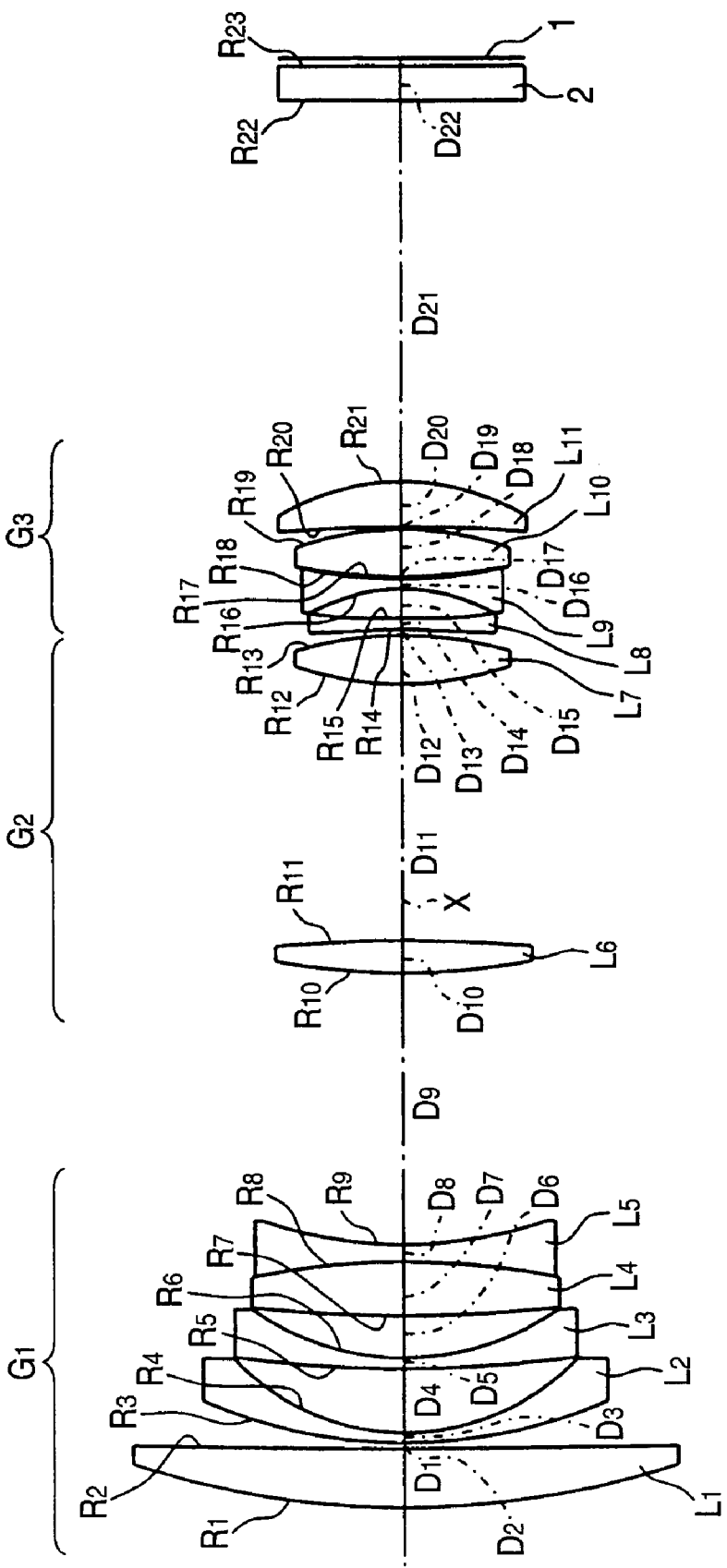
FIG. 3 is a schematic view showing a configuration of a projection zoom lens according to an example 2 of the invention.

FIG. 3 shows a schematic configuration of a projection zoom lens according to an example 2. In this example 2, description already made in the example 1 will be omitted.

A lens configuration of the projection zoom lens according to the example 2 is almost similar to that in the example 1. However, the lens configuration of the example 2 is different from that of the example 1 mainly in that the third lens $L_3$ is made of a negative meniscus lens whose concave surface is directed to the reduction side, the tenth lens $L_{10}$ is made of a biconvex lens, and the eleventh lens $L_{11}$ is made of a positive meniscus lens whose convex surface is directed to the reduction side.

Values of the radius of curvature R (mm) of the respective lens surfaces of this projection zoom lens, center thicknesses of the respective lenses and air distances D (mm) between the respective lenses, and the refractive indices N of the respective lenses with respect to d-line and the Abbe numbers νd of the respective lenses with respect to d-line are given in Table 2. Also, values of the focal length f (mm), the back focus Bfw (mm), the FNo, and the angle of view 2ω (degree) are given at the upper portion of Table 2.

TABLE 2 f = 16.75~21.15~26.71
Bfw = 36.01
Fno = 2.21~2.52~2.93
2ω = 67.4°~55.4°~44.8°

| Surface | R | D | Nd | νd |
|---|---|---|---|---|
| 1 | 74.725 | 5.26 | 1.51633 | 64.1 |
| 2 | 1007.188 | 0.50 | | |
| 3 | 43.572 | 0.90 | 1.65160 | 58.5 |
| 4 | 20.715 | 5.56 | | |
| 5 | 114.142 | 0.90 | 1.79952 | 42.2 |
| 6 | 23.479 | 3.65 | | |
| 7 | 129.456 | 4.63 | 1.80518 | 25.4 |
| 8 | −68.141 | 1.50 | 1.56384 | 60.7 |
| 9 | 38.158 | 23.94~13.51~5.28 | | |
| 10 | 61.988 | 2.90 | 1.83481 | 42.7 |
| 11 | −122.337 | 22.55 | | |
| 12 | 30.027 | 4.24 | 1.56384 | 60.7 |
| 13 | −34.762 | 0.50~1.90~3.83 | | |
| *14 | −37.368 | 1.00 | 1.68893 | 31.1 |
| *15 | −107.085 | 2.51 | | |
| 16 | −17.164 | 0.90 | 1.84666 | 23.8 |
| 17 | 43.946 | 0.20 | | |
| 18 | 52.098 | 4.14 | 1.60311 | 60.7 |
| 19 | −27.831 | 0.20 | | |
| 20 | −147.678 | 4.00 | 1.80518 | 25.4 |
| 21 | −21.436 | 33.50~38.18~43.83 | | |
| 22 | ∞ | 3.00 | 1.48749 | 70.2 |
| | ∞ | | | |

*Aspheric surface coefficient

| | Surface number | |
|---|---|---|
| | 14 | 15 |
| K | −101.9216983 | −2415.7283250 |
| $A_3$ | $1.5163079 \times 10^{-3}$ | $1.4028474 \times 10^{-3}$ |
| $A_4$ | $-1.1456092 \times 10^{-3}$ | $-1.0306284 \times 10^{-3}$ |
| $A_5$ | $4.0857646 \times 10^{-4}$ | $4.0780492 \times 10^{-4}$ |
| $A_6$ | $-5.6920813 \times 10^{-5}$ | $-5.5341152 \times 10^{-5}$ |
| $A_7$ | $9.7678014 \times 10^{-7}$ | $5.0725079 \times 10^{-7}$ |
| $A_8$ | $4.5800943 \times 10^{-7}$ | $4.1678188 \times 10^{-7}$ |
| $A_9$ | $-1.5635108 \times 10^{-8}$ | $7.1263930 \times 10^{-9}$ |
| $A_{10}$ | $-3.6821700 \times 10^{-9}$ | $-6.1489396 \times 10^{-9}$ |
| $A_{11}$ | $2.3399460 \times 10^{-10}$ | $3.2173875 \times 10^{-10}$ |

Also, the projection zoom lens of the example 2 satisfies all the conditional expressions (1) to (5) and the conditional expression (2') as shown in Table 7.

Figure 4:
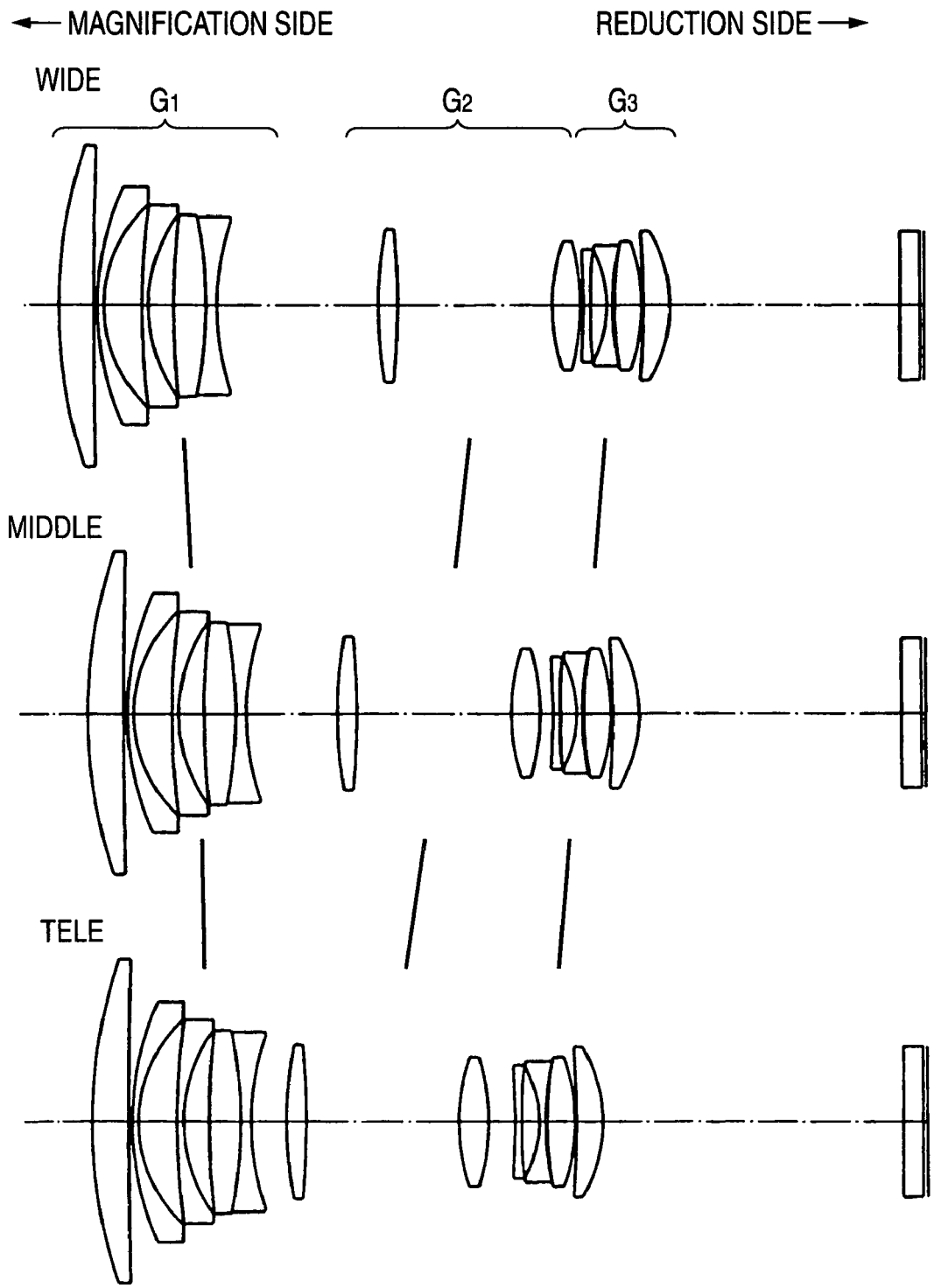
FIG. 4 is a schematic view showing a lens moving locus in the projection zoom lens according to the example 2 during the varying of the power.

Also, FIG. 4 shows a lens moving locus in the projection zoom lens according to the example 2 during the varying of the power.

Figure 17:
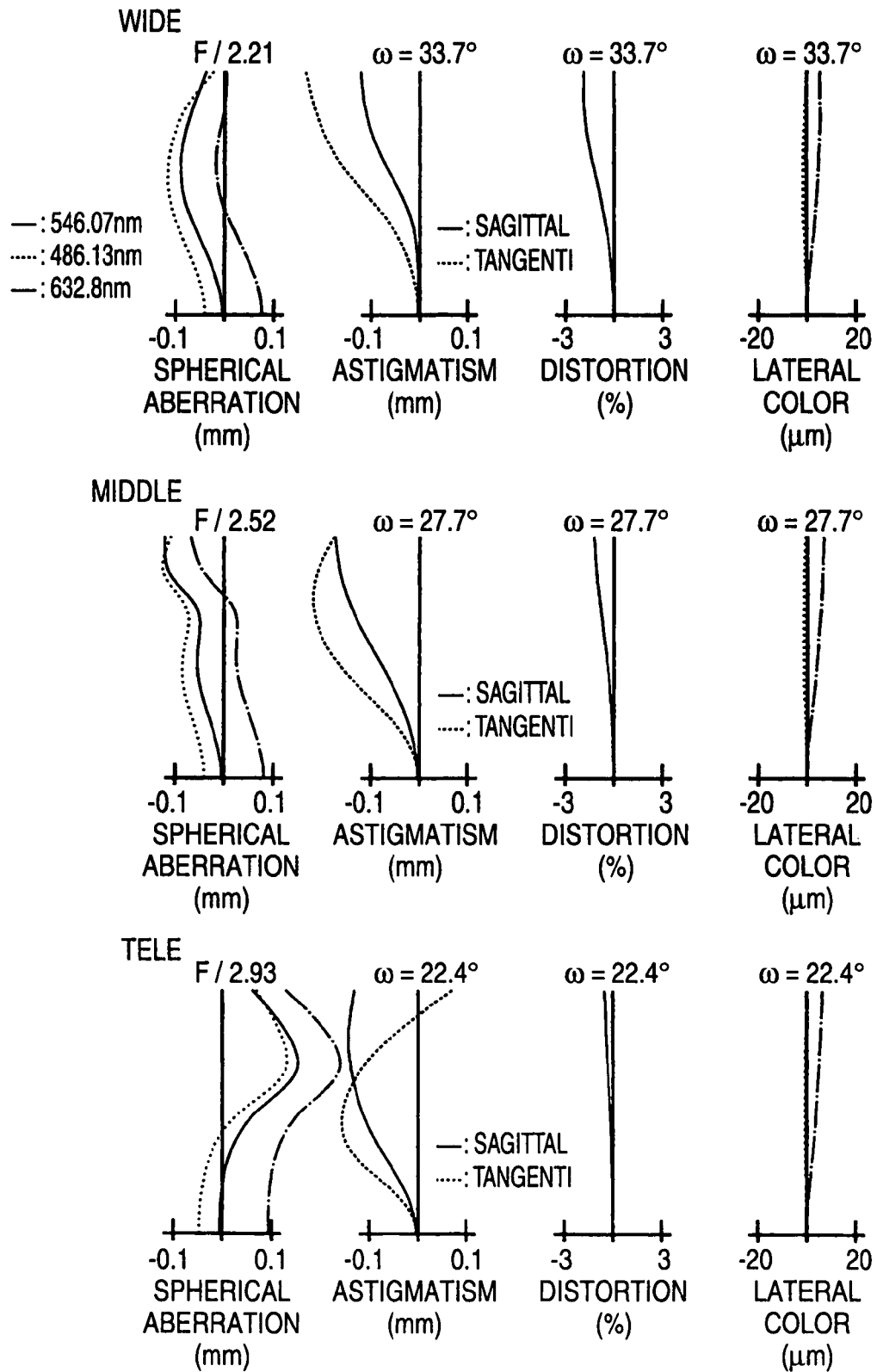
FIG. 17 is an aberration chart showing various aberrations (spherical aberration, astigmatism, distortion, and lateral color) of the projection zoom lens of the example 2.

In addition, FIG. 17 is an aberration chart showing the spherical aberration, the astigmatism, the distortion, and the lateral color of the projection zoom lens of the example 2. Here, the aberrations as to the sagittal image surface and the tangential image surface are shown in the astigmatism chart.

Figure 19:
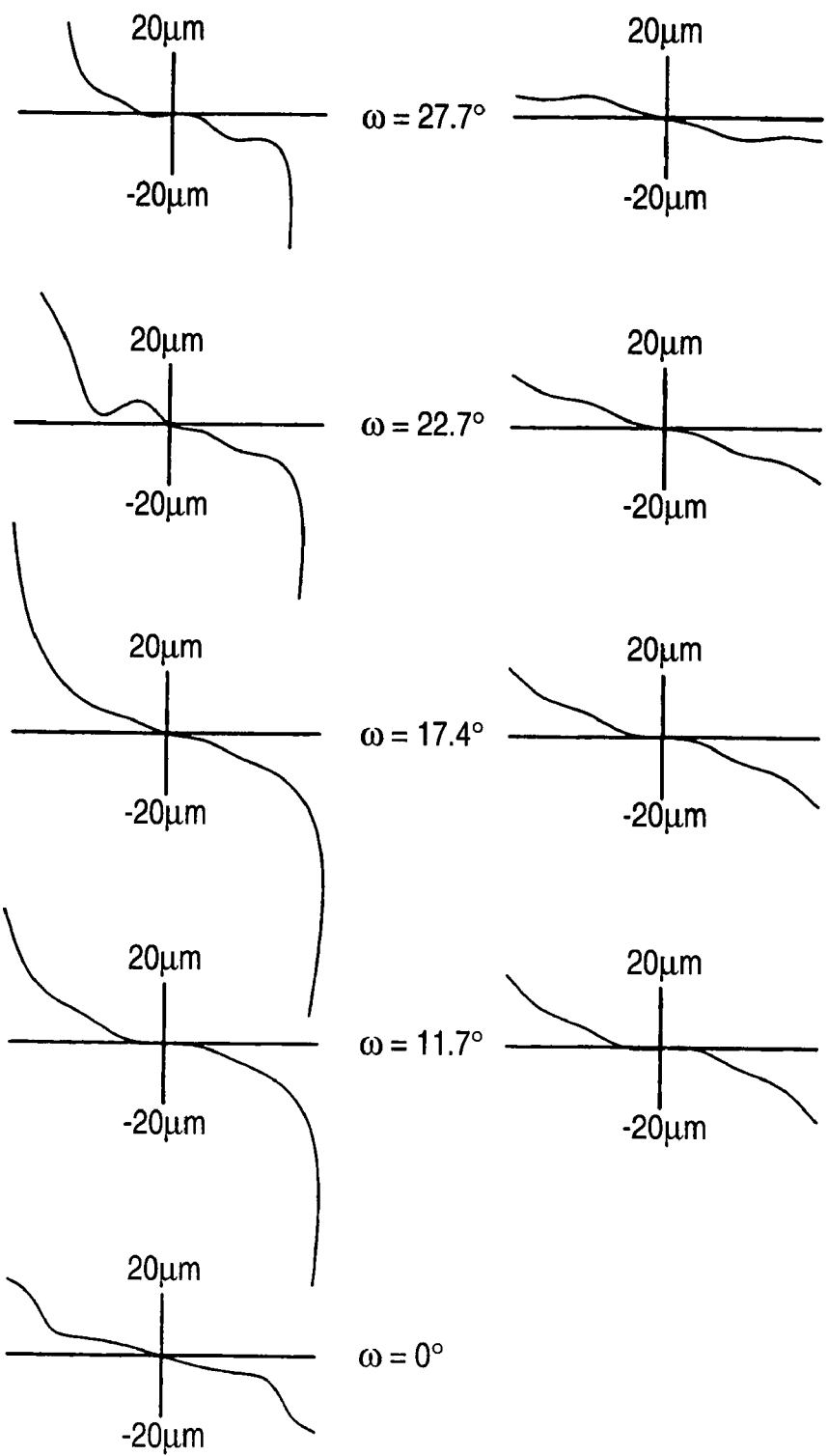
FIG. 19 is a chart of transverse aberrations of the projection zoom lens of the example 2 at the wavelength of 546.07 nm in a middle range.
Figure 20:
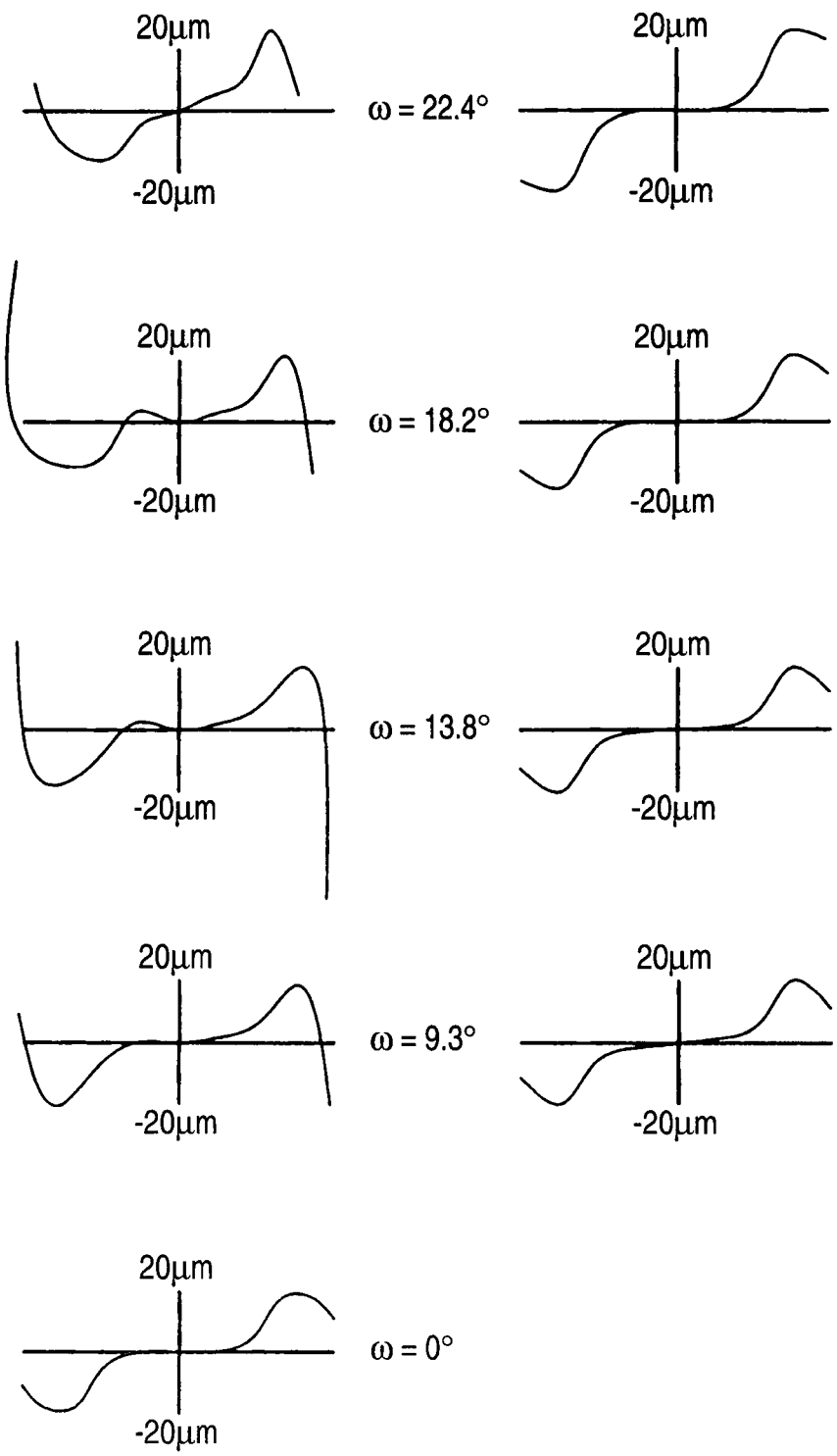
FIG. 20 is a chart of transverse aberrations of the projection zoom lens of the example 2 at the wavelength of 546.07 nm at a telephoto end.

Also, FIGS. 18 to 20 are transverse aberration charts at a wavelength of 546.07 nm at the wide-angle end, in the middle range, and at the telephoto end in Table 2, respectively.

As apparent from these aberration charts, the projection zoom lens of the example 2 can correct respective aberrations, especially the lateral color satisfactorily.

Also, the projection zoom lens of the example 2 can improve the variable power ratio up to almost 1.59 times close to 1.6 times while maintaining the good optical performance.

Example 3

Figure 5:
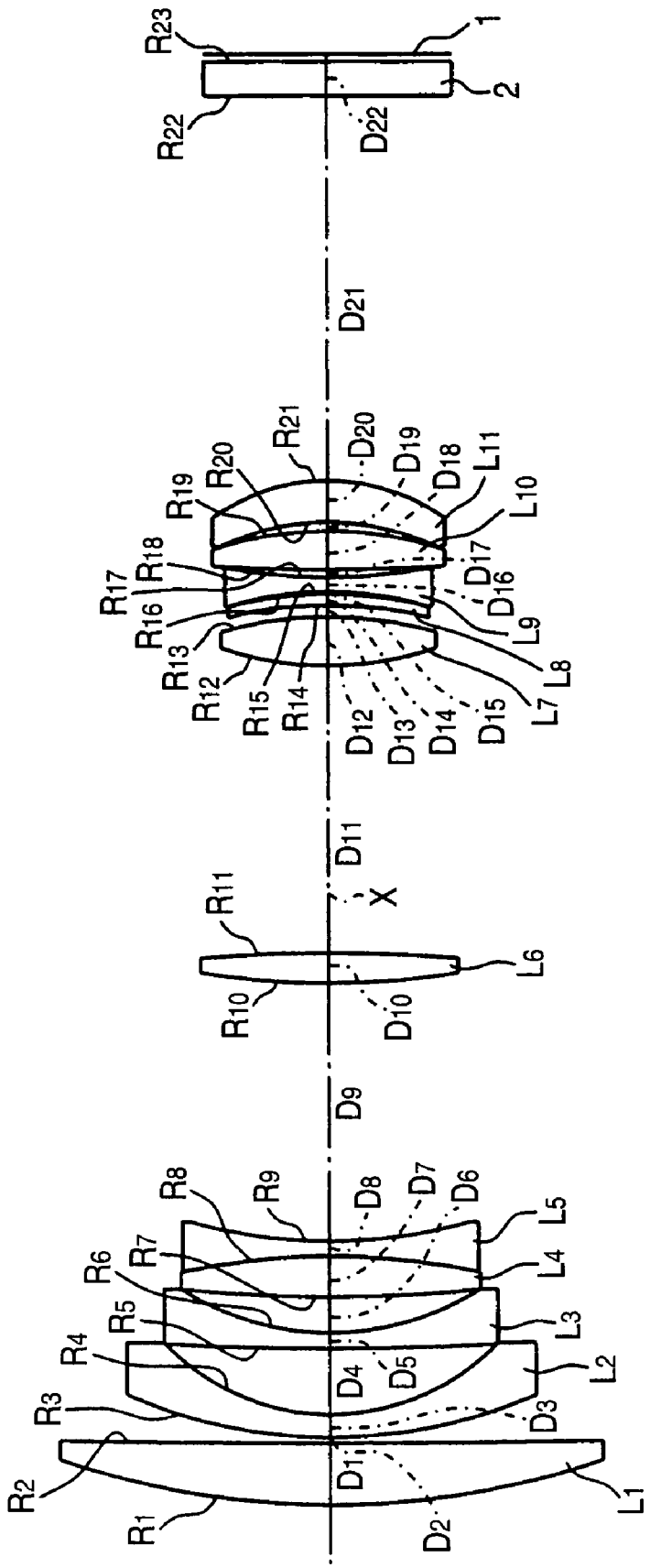
FIG. 5 is a schematic view showing a configuration of a projection zoom lens according to an example 3 of the invention.

FIG. 5 is a schematic configuration of a projection zoom lens according to the example 3. In this example 3, description already made in the example 2 will be omitted.

A lens configuration of the projection zoom lens according to the example 3 is almost similar to that of the example 2.

Values of the radius of curvature R (mm) of the respective lens surfaces of this projection zoom lens, center thicknesses of the respective lenses and air distances D (mm) between the respective lenses, and the refractive indices N of the respective lenses with respect to d-line and the Abbe numbers νd of the respective lenses with respect to d-line are given in Table 3. Also, values of the focal length f (mm), the back focus Bfw (mm), the FNo, and the angle of view 2ω (degree) are given at the upper portion of Table 3.

TABLE 3 f = 16.74~21.15~26.70
Bfw = 36.01
Fno = 2.25~2.55~2.96
2ω = 67.4°~55.4°~44.8°

| Surface | R | D | Nd | νd |
|---|---|---|---|---|
| 1 | 73.752 | 5.38 | 1.51633 | 64.1 |
| 2 | 1270.600 | 0.50 | | |
| 3 | 44.433 | 2.00 | 1.65160 | 58.5 |
| 4 | 20.085 | 5.74 | | |
| 5 | 235.594 | 1.40 | 1.79952 | 42.2 |
| 6 | 24.412 | 3.12 | | |
| 7 | 131.127 | 3.58 | 1.80518 | 25.4 |
| 8 | −61.913 | 1.30 | 1.56384 | 60.7 |
| 9 | 45.028 | 22.70~12.37~4.20 | | |
| 10 | 68.033 | 2.70 | 1.83481 | 42.7 |
| 11 | −157.886 | 25.20 | | |
| 12 | 29.651 | 4.25 | 1.56384 | 60.7 |
| 13 | −35.417 | 1.03~2.22~3.95 | | |
| *14 | −38.438 | 1.00 | 1.68893 | 31.1 |
| *15 | −30.502 | 0.20 | | |

TABLE 3-continued

| 16 | -30.490 | 1.30 | | 1.84666 | 23.8 |
|---|---|---|---|---|---|
| 17 | 47.855 | 0.67 | | | |
| 18 | 153.294 | 3.49 | | 1.60311 | 60.7 |
| 19 | -32.410 | 0.75 | | | |
| 20 | -22.322 | 3.63 | | 1.80518 | 25.4 |
| 21 | -17.714 | 33.50~38.51~44.48 | | | |
| 22 | ∞ | 3.00 | | 1.48749 | 70.2 |
| | ∞ | | | | |

*Aspheric surface coefficient

| | Surface number | |
|---|---|---|
| | 14 | 15 |
| K | 1.2026293 | -113.9230008 |
| $A_3$ | $2.1622432 \times 10^{-3}$ | $2.2533338 \times 10^{-3}$ |
| $A_4$ | $-1.3714589 \times 10^{-3}$ | $-1.9898425 \times 10^{-3}$ |
| $A_5$ | $4.3902157 \times 10^{-4}$ | $5.5498001 \times 10^{-4}$ |
| $A_6$ | $-6.5281237 \times 10^{-5}$ | $-7.1599954 \times 10^{-5}$ |
| $A_7$ | $2.0206089 \times 10^{-6}$ | $2.6290302 \times 10^{-6}$ |
| $A_8$ | $4.8411472 \times 10^{-7}$ | $1.2997889 \times 10^{-7}$ |
| $A_9$ | $-3.2480334 \times 10^{-8}$ | $3.3442870 \times 10^{-8}$ |
| $A_{10}$ | $-2.1514392 \times 10^{-9}$ | $-7.2612794 \times 10^{-9}$ |
| $A_{11}$ | $1.8075914 \times 10^{-10}$ | $3.2828538 \times 10^{-10}$ |

Also, the projection zoom lens of the example 3 satisfies all the conditional expressions (1) to (5) and the conditional expression (2') as shown in Table 7.

Figure 6:
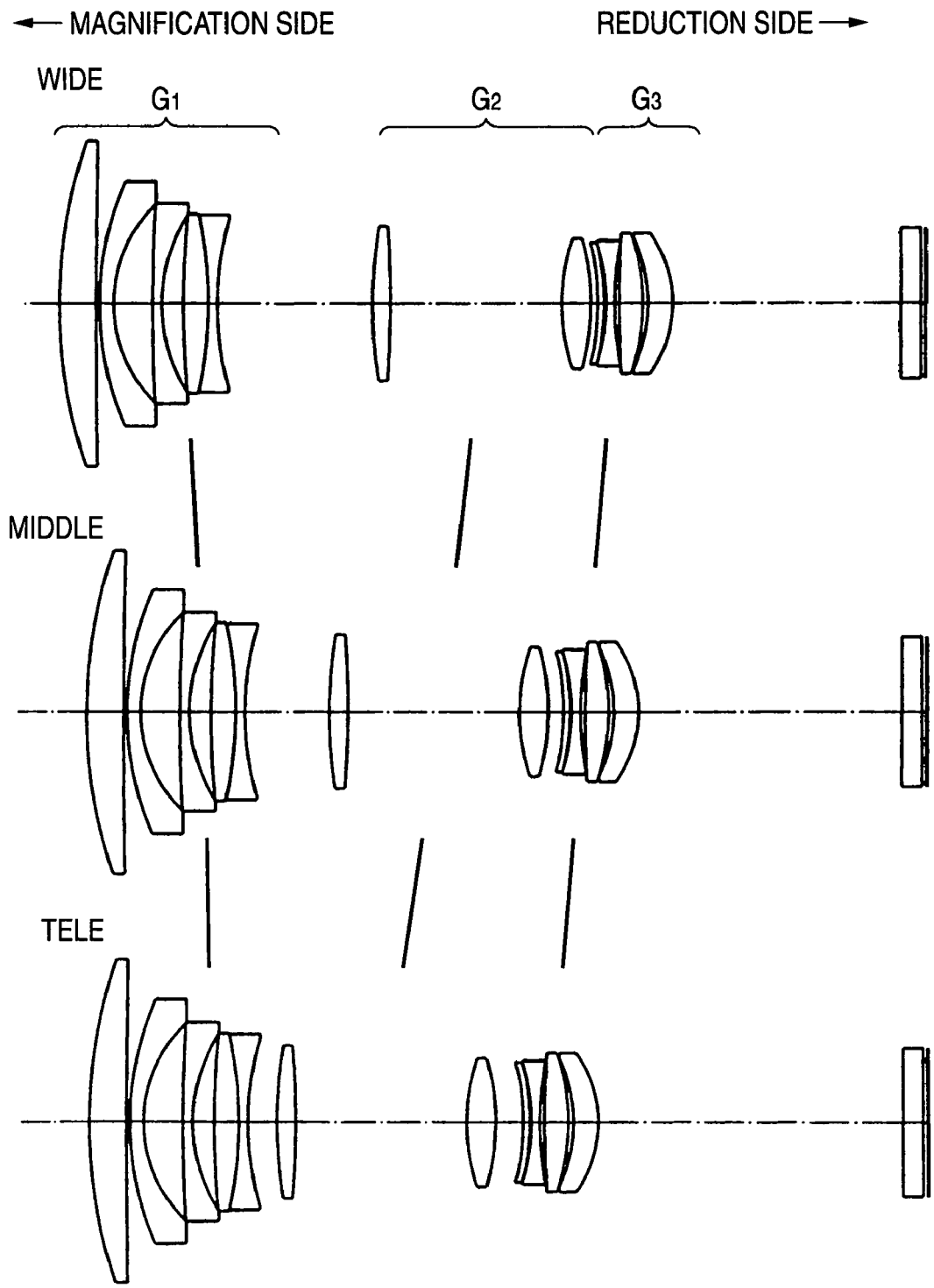
FIG. 6 is a schematic view showing a lens moving locus in the projection zoom lens according to the example 3 during the varying of the power.

Also, FIG. 6 shows a lens moving locus in the projection zoom lens according to the example 3 during the varying of the power.

In addition, FIG. 21 is an aberration chart showing the spherical aberration, the astigmatism, the distortion, and the lateral color of the projection zoom lens of the example 3. Here, the aberrations as to the sagittal image surface and the tangential image surface are shown in the astigmatism chart.

Figure 22:
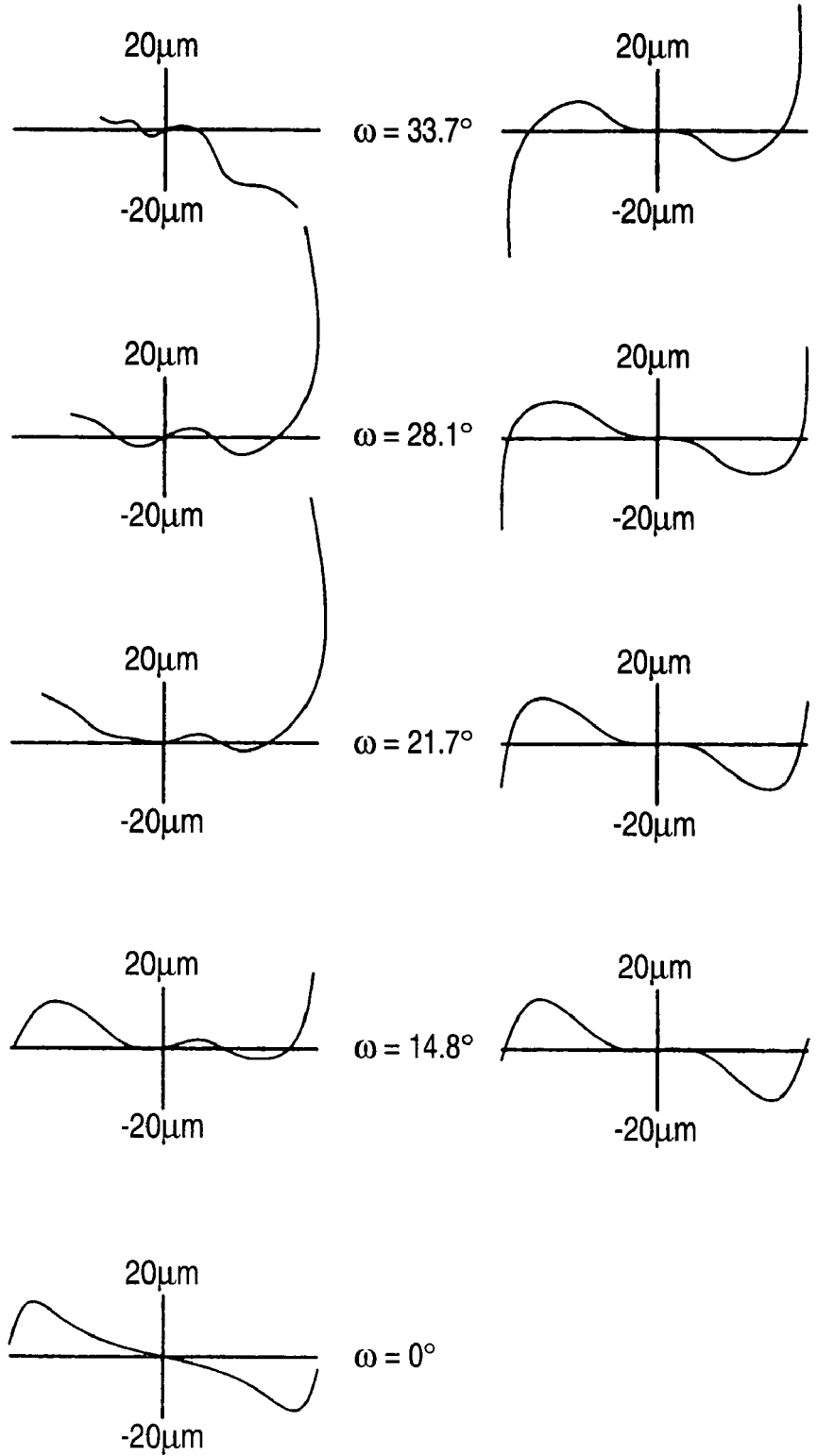
FIG. 22 is a chart of transverse aberrations of the projection zoom lens of the example 3 at the wavelength of 546.07 nm at a wide-angle end.
Figure 23:
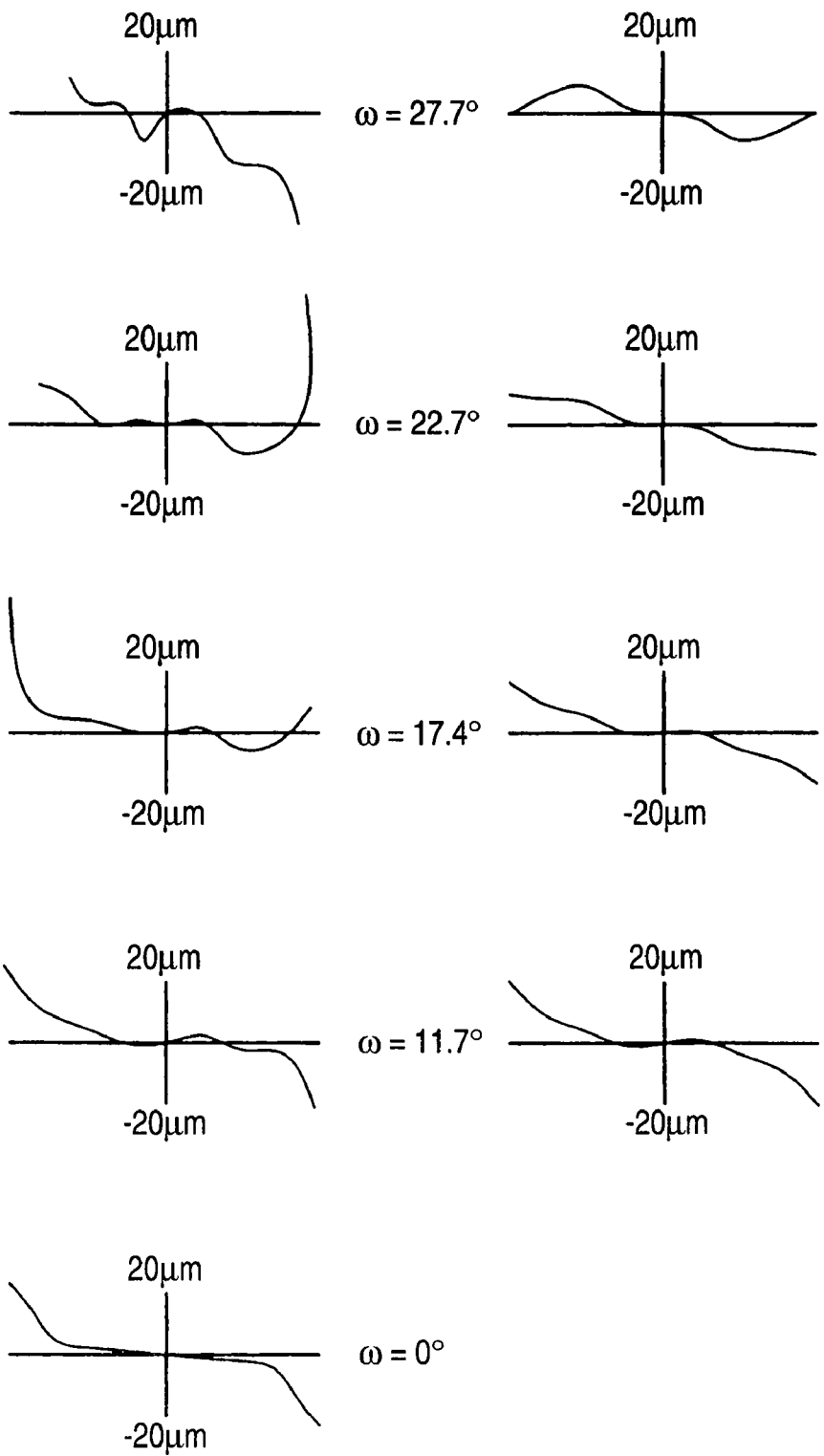
FIG. 23 is a chart of transverse aberrations of the projection zoom lens of the example 3 at the wavelength of 546.07 nm in a middle range.
Figure 24:
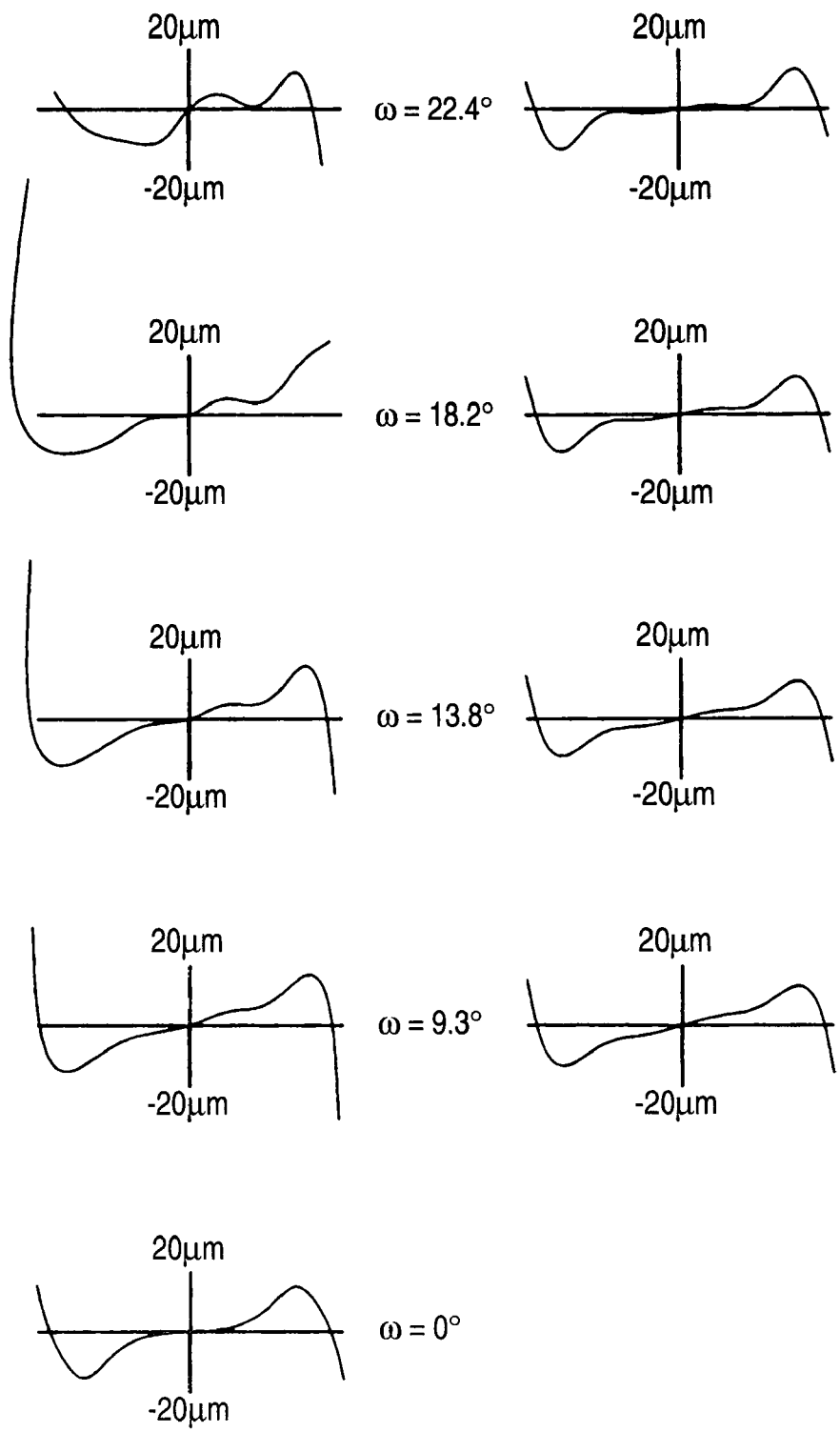
FIG. 24 is a chart of transverse aberrations of the projection zoom lens of the example 3 at the wavelength of 546.07 nm at a telephoto end.

Also, FIGS. 22 to 24 are transverse aberration charts at a wavelength of 546.07 nm at the wide-angle end, in the middle range, and at the telephoto end of Table 3, respectively.

As apparent from these aberration charts, the projection zoom lens of the example 3 can correct respective aberrations, especially the lateral color satisfactorily.

Also, the projection zoom lens of the example 3 can improve the variable power ratio up to almost 1.59 times close to 1.6 times while maintaining the good optical performance.

Example 4

Figure 7:
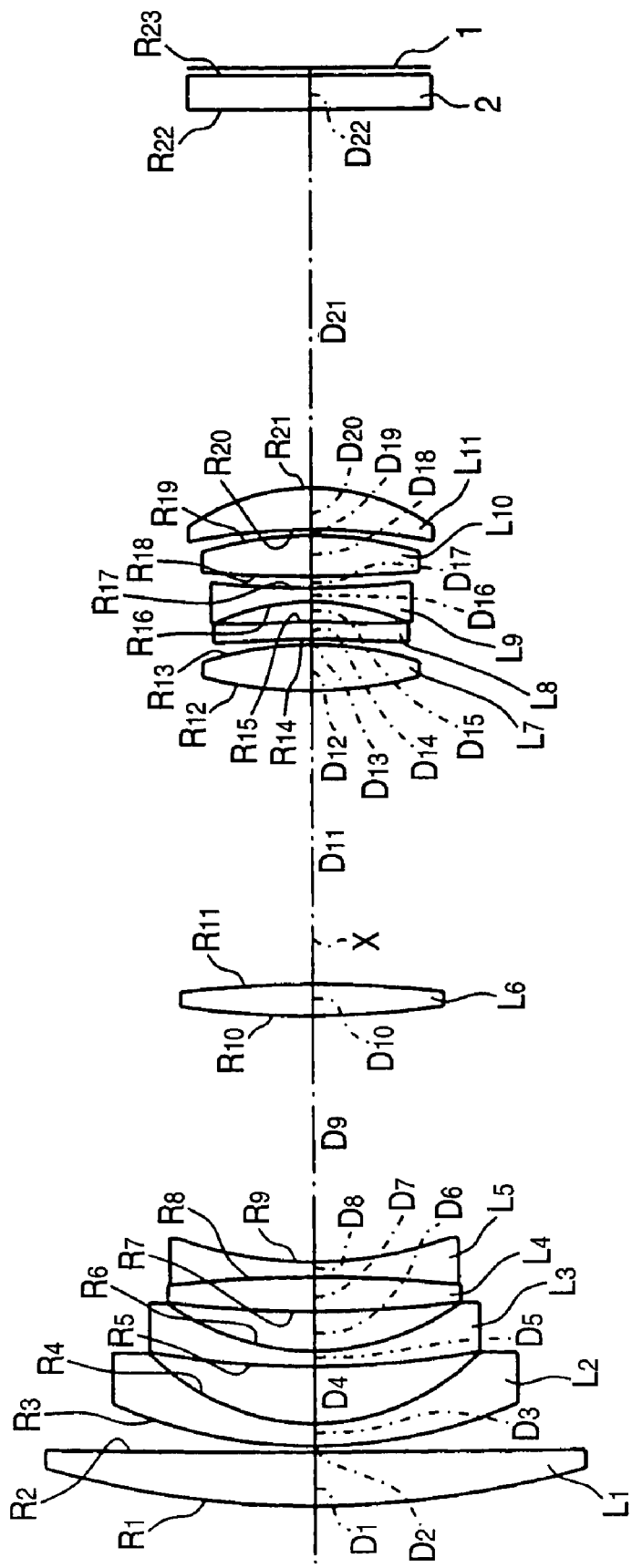
FIG. 7 is a schematic view showing a configuration of a projection zoom lens according to an example 4 of the invention.

FIG. 7 shows a schematic configuration of a projection zoom lens according to the example 4. In this example 4, description already made in the example 2 will be omitted.

A lens configuration of the projection zoom lens according to the example 4 is almost similar to that of the example 2.

Values of the radius of curvature R (mm) of the respective lens surfaces of this projection zoom lens, center thicknesses of the respective lenses and air distances D (mm) between the respective lenses, and the refractive indices N of the respective lenses with respect to d-line and the Abbe numbers vd of the respective lenses with respect to d-line are given in Table 4. Also, values of the focal length f (mm), the back focus Bfw (mm), the FNo, and the angle of view 2ω (degree) are given at the upper portion of Table 4.

TABLE 4 f = 16.74~21.14~26.70
Bfw = 36.01
Fno = 2.21~2.54~2.97
2ω = 67.4°~55.4°~44.8°

| Surface | R | D | Nd | vd |
|---|---|---|---|---|
| 1 | 85.678 | 4.80 | 1.51633 | 64.1 |
| 2 | 1834.292 | 0.50 | | |
| 3 | 44.849 | 2.00 | 1.65160 | 58.5 |
| 4 | 20.351 | 5.01 | | |
| 5 | 83.172 | 1.40 | 1.74400 | 44.8 |
| 6 | 22.503 | 3.46 | | |
| 7 | 110.743 | 3.00 | 1.78472 | 25.7 |
| 8 | -115.394 | 1.30 | 1.58913 | 61.2 |
| 9 | 34.851 | 21.88~11.69~3.67 | | |
| 10 | 80.877 | 2.85 | 1.83481 | 42.7 |
| 11 | -101.830 | 26.10 | | |
| 12 | 39.338 | 4.07 | 1.58913 | 61.2 |
| 13 | -31.928 | 0.50~2.17~4.61 | | |
| *14 | -46.651 | 1.50 | 1.68893 | 31.1 |
| *15 | -49.128 | 1.79 | | |
| 16 | -20.908 | 1.20 | 1.78472 | 25.7 |
| 17 | 82.725 | 1.07 | | |
| 18 | 133.987 | 3.64 | 1.51633 | 64.1 |
| 19 | -33.571 | 0.54 | | |
| 20 | -56.039 | 3.73 | 1.62004 | 36.3 |
| 21 | -19.282 | 33.50~38.54~44.48 | | |
| 22 | ∞ | 3.00 | 1.48749 | 70.2 |
| | ∞ | | | |

*Aspheric surface coefficient

| | Surface number | |
|---|---|---|
| | 14 | 15 |
| K | -214.9165614 | -483.9157409 |
| $A_3$ | $1.6287301 \times 10^{-3}$ | $1.6032325 \times 10^{-3}$ |
| $A_4$ | $-1.3393965 \times 10^{-3}$ | $-1.5713781 \times 10^{-3}$ |
| $A_5$ | $4.1783341 \times 10^{-4}$ | $4.8880234 \times 10^{-4}$ |
| $A_6$ | $-5.6796213 \times 10^{-5}$ | $-5.7149848 \times 10^{-5}$ |
| $A_7$ | $1.7385895 \times 10^{-6}$ | $6.5518823 \times 10^{-9}$ |
| $A_8$ | $3.7114769 \times 10^{-7}$ | $4.2170928 \times 10^{-7}$ |
| $A_9$ | $-2.6615855 \times 10^{-8}$ | $1.8090702 \times 10^{-8}$ |
| $A_{10}$ | $-1.3336433 \times 10^{-9}$ | $-7.2873053 \times 10^{-9}$ |
| $A_{11}$ | $1.2436743 \times 10^{-10}$ | $3.5511789 \times 10^{-10}$ |

Also, the projection zoom lens of the example 4 satisfies all the conditional expressions (1) to (5) and the conditional expression (2') as shown in Table 7.

Figure 8:
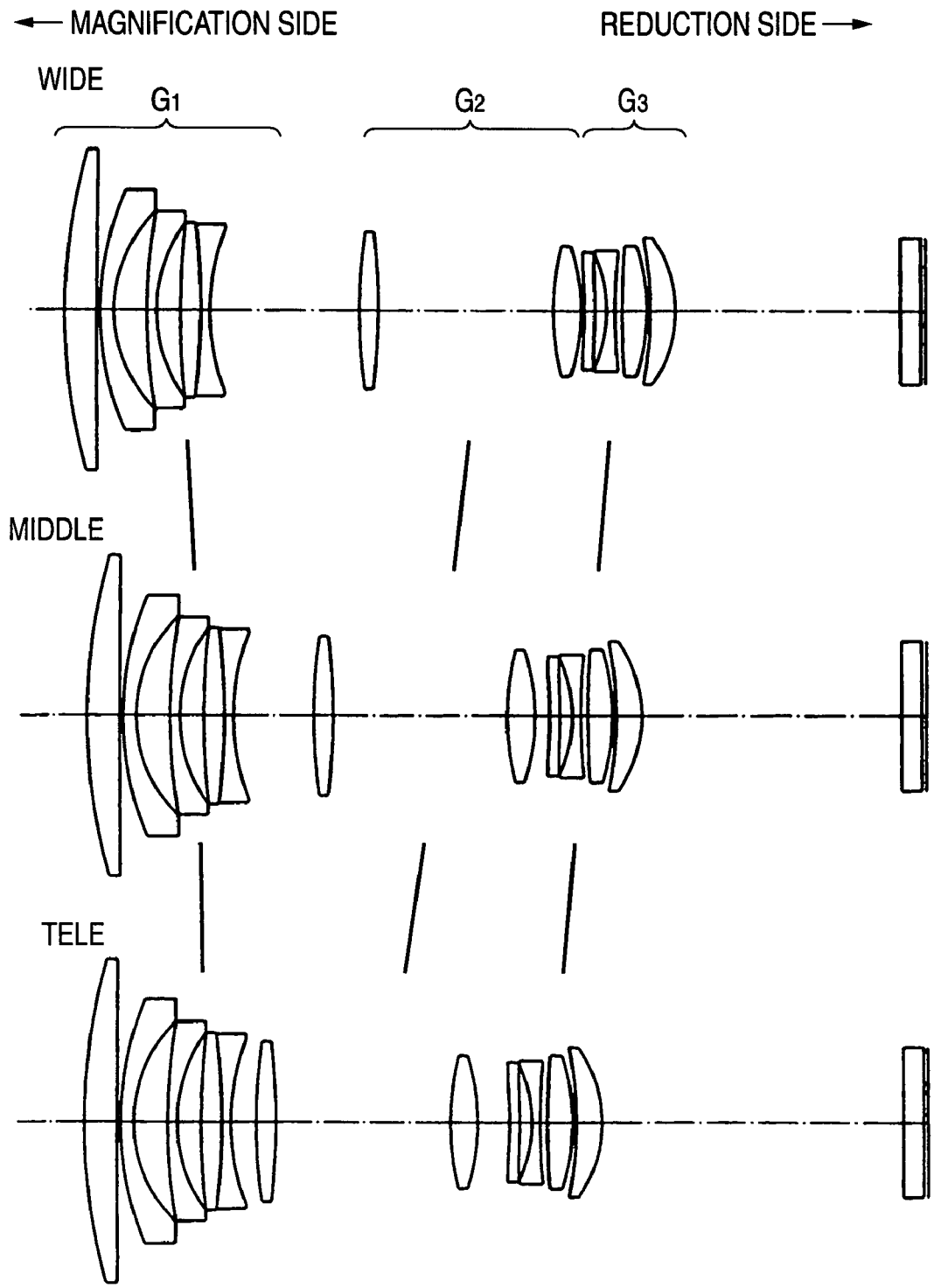
FIG. 8 is a schematic view showing a lens moving locus in the projection zoom lens according to the example 4 during the varying of the power.

Also, FIG. 8 shows a lens moving locus in the projection zoom lens according to the example 4 during the varying of the power.

Figure 25:
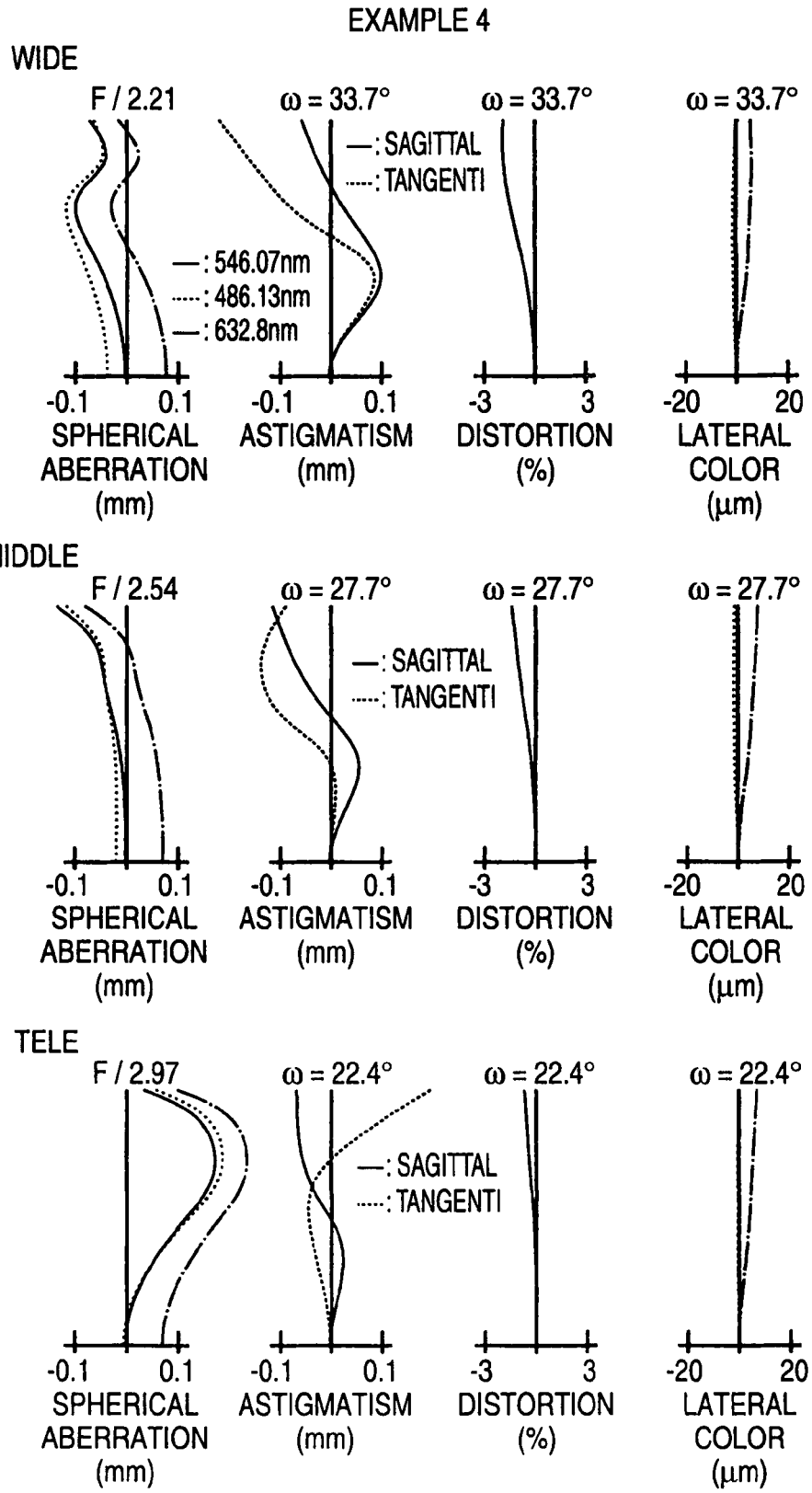
FIG. 25 is an aberration chart showing various aberrations (spherical aberration, astigmatism, distortion, and lateral color) of the projection zoom lens of the example 4.

In addition, FIG. 25 is an aberration chart showing the spherical aberration, the astigmatism, the distortion, and the lateral color of the projection zoom lens of the example 4. Here, the aberrations as to the sagittal image surface and the tangential image surface are shown in the astigmatism chart.

Figure 27:
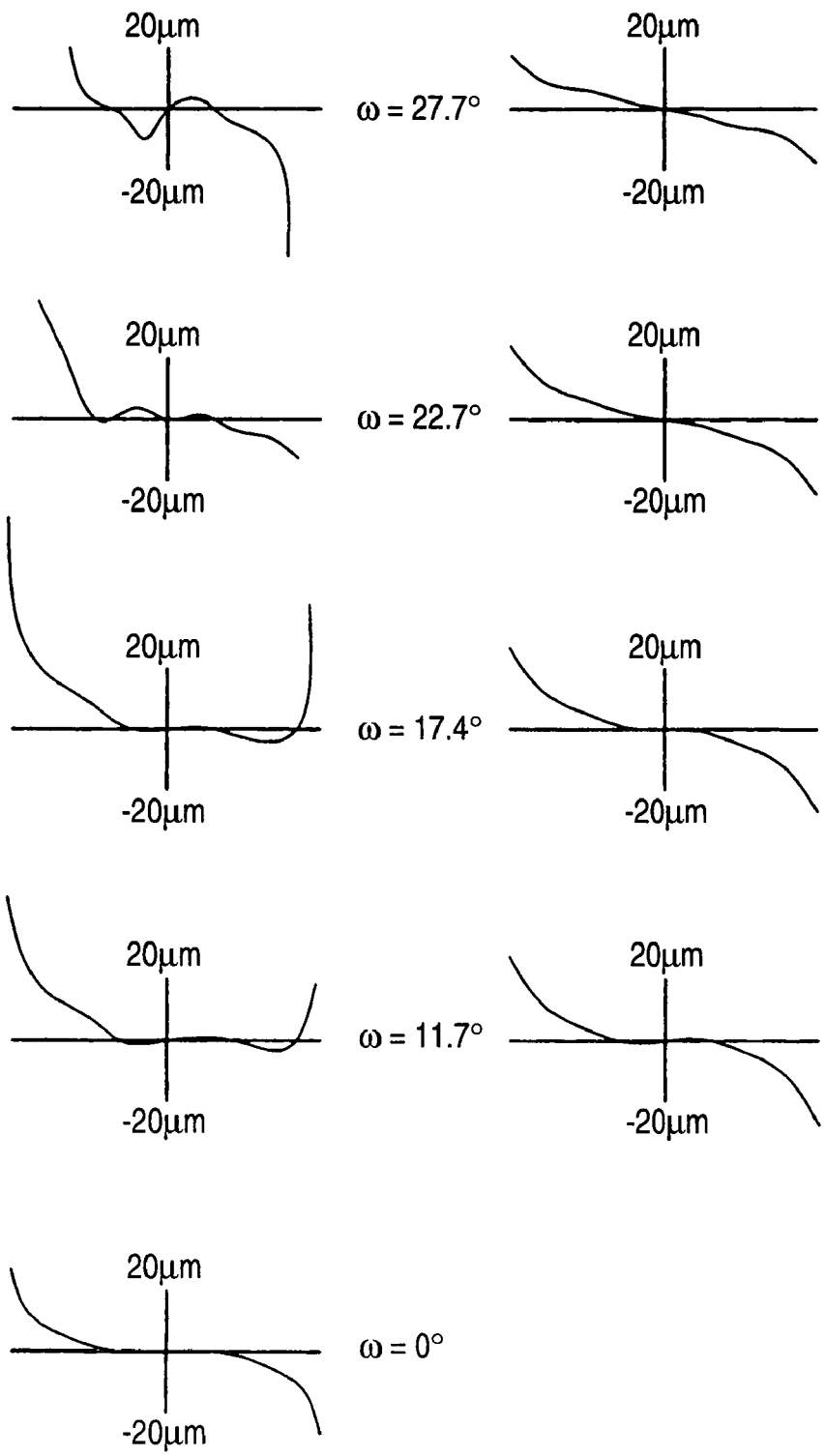
FIG. 27 is a chart of transverse aberrations of the projection zoom lens of the example 4 at the wavelength of 546.07 nm in a middle range.

Also, FIGS. 26 to 28 are transverse aberration charts at a wavelength of 546.07 nm at the wide-angle end, in the middle range, and at the telephoto end in Table 4, respectively.

As apparent from these aberration charts, the projection zoom lens of the example 4 can correct respective aberrations, especially the lateral color satisfactorily.

Also, the projection zoom lens in Example 4 can improve the variable power ratio up to almost 1.59 times close to 1.6 times while maintaining the good optical performance.

Example 5

Figure 9:
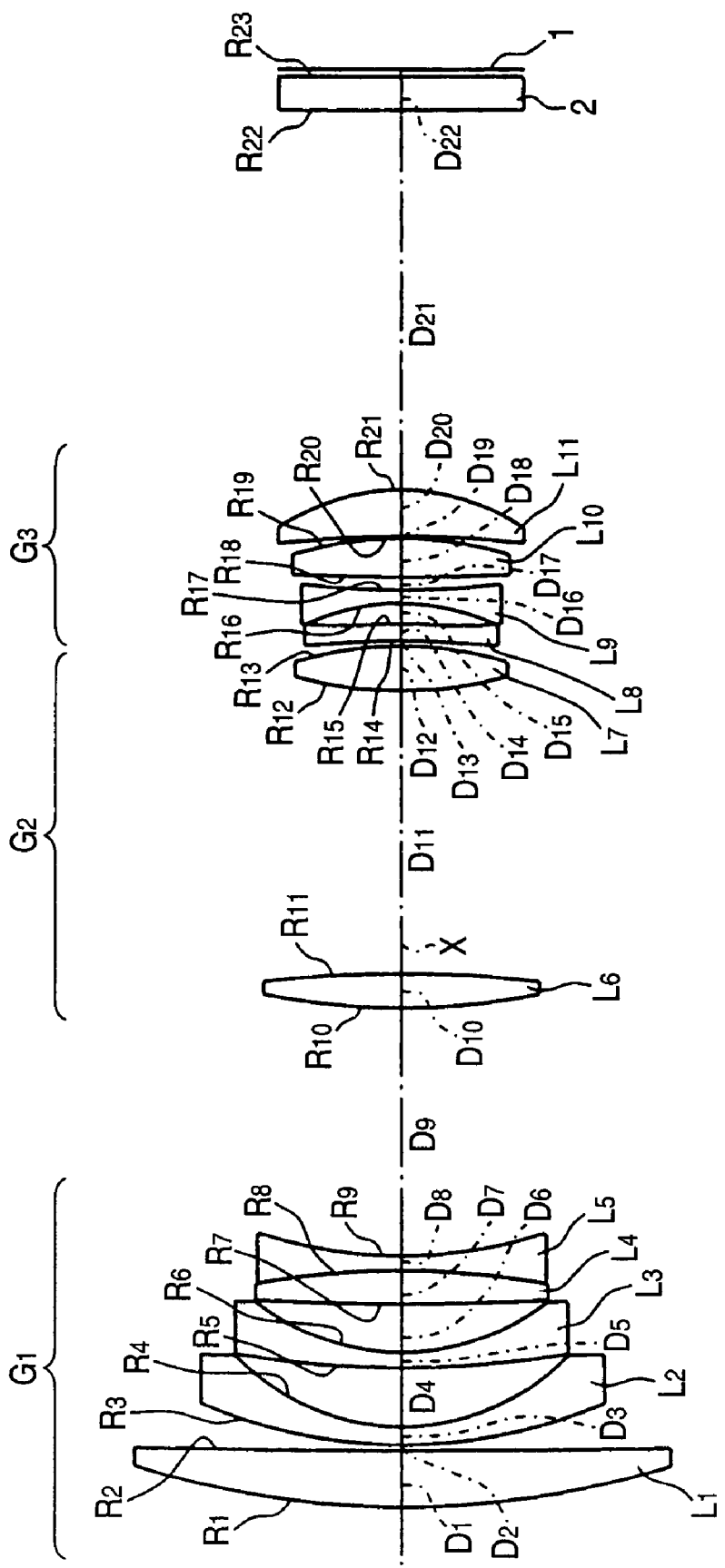
FIG. 9 is a schematic view showing a configuration of a projection zoom lens according to an example 5 of the invention.

FIG. 9 shows a schematic configuration of a projection zoom lens according to the example 5. In this example 5, description already made in the example 2 will be omitted.

A lens configuration of the projection zoom lens according to the example 5 is almost similar to that of the example 2.

Values of the radius of curvature R (mm) of the respective lens surfaces of this projection zoom lens, center thicknesses of the respective lenses and air distances D (mm) between the respective lenses, and the refractive indices N of the respective lenses with respect to d-line and the Abbe numbers νd of the respective lenses with respect to d-line are given in Table 5. Also, values of the focal length f (mm), the back focus Bfw (mm), the FNo, and the angle of view 2ω (degree) are given at the upper portion of Table 5.

TABLE 5 f = 16.77~21.19~26.75
Bfw = 36.01
Fno = 2.23~2.57~3.01
2ω = 67.2°~55.4°~44.8°

| Surface | R | D | Nd | νd |
|---|---|---|---|---|
| 1 | 78.235 | 5.08 | 1.51633 | 64.1 |
| 2 | 1373.580 | 0.50 | | |
| 3 | 45.669 | 1.60 | 1.65160 | 58.5 |
| 4 | 20.418 | 5.20 | | |
| 5 | 88.605 | 1.40 | 1.70000 | 48.1 |
| 6 | 21.064 | 4.29 | | |
| 7 | 277.590 | 3.02 | 1.80518 | 25.4 |
| 8 | −72.151 | 1.30 | 1.56384 | 60.7 |
| 9 | 39.331 | 22.10~12.05~4.13 | | |
| 10 | 62.352 | 3.06 | 1.77250 | 49.6 |
| 11 | −104.089 | 25.14 | | |
| 12 | 36.981 | 3.97 | 1.58913 | 61.2 |
| 13 | −32.677 | 0.50~2.00~4.24 | | |
| *14 | −41.584 | 1.50 | 1.68893 | 31.1 |
| *15 | −56.286 | 1.88 | | |
| 16 | −20.261 | 1.20 | 1.75520 | 27.5 |
| 17 | 76.856 | 1.17 | | |
| 18 | 195.761 | 3.45 | 1.51633 | 64.1 |
| 19 | −33.611 | 0.20 | | |
| 20 | −99.172 | 4.13 | 1.58144 | 40.7 |
| 21 | −19.618 | 33.50~38.83~45.03 | | |
| 22 | ∞ | 3.00 | 1.48749 | 70.2 |
| | ∞ | | | |

*Aspheric surface coefficient

| | Surface number | |
|---|---|---|
| | 14 | 15 |
| K | −213.9742291 | −784.6106211 |
| $A_3$ | $1.2848283 \times 10^{-3}$ | $1.2014268 \times 10^{-3}$ |
| $A_4$ | $-1.3265600 \times 10^{-3}$ | $-1.4252827 \times 10^{-3}$ |
| $A_5$ | $4.2384546 \times 10^{-4}$ | $4.7620427 \times 10^{-4}$ |
| $A_6$ | $-5.6868538 \times 10^{-5}$ | $-5.7657408 \times 10^{-5}$ |
| $A_7$ | $1.5870267 \times 10^{-6}$ | $7.6298954 \times 10^{-8}$ |
| $A_8$ | $3.7294716 \times 10^{-7}$ | $4.2102703 \times 10^{-7}$ |
| $A_9$ | $-2.5185763 \times 10^{-8}$ | $1.8152973 \times 10^{-8}$ |
| $A_{10}$ | $-1.3218087 \times 10^{-9}$ | $-7.2324001 \times 10^{-9}$ |
| $A_{11}$ | $1.1750605 \times 10^{-10}$ | $3.4963421 \times 10^{-10}$ |

Also, the projection zoom lens of the example 5 satisfies all the conditional expressions (1) to (5) and the conditional expression (2′) as shown in Table 7.

Also, FIG. 10 shows a lens moving locus in the projection zoom lens according to the example 5 during the varying of the power.

Figure 29:
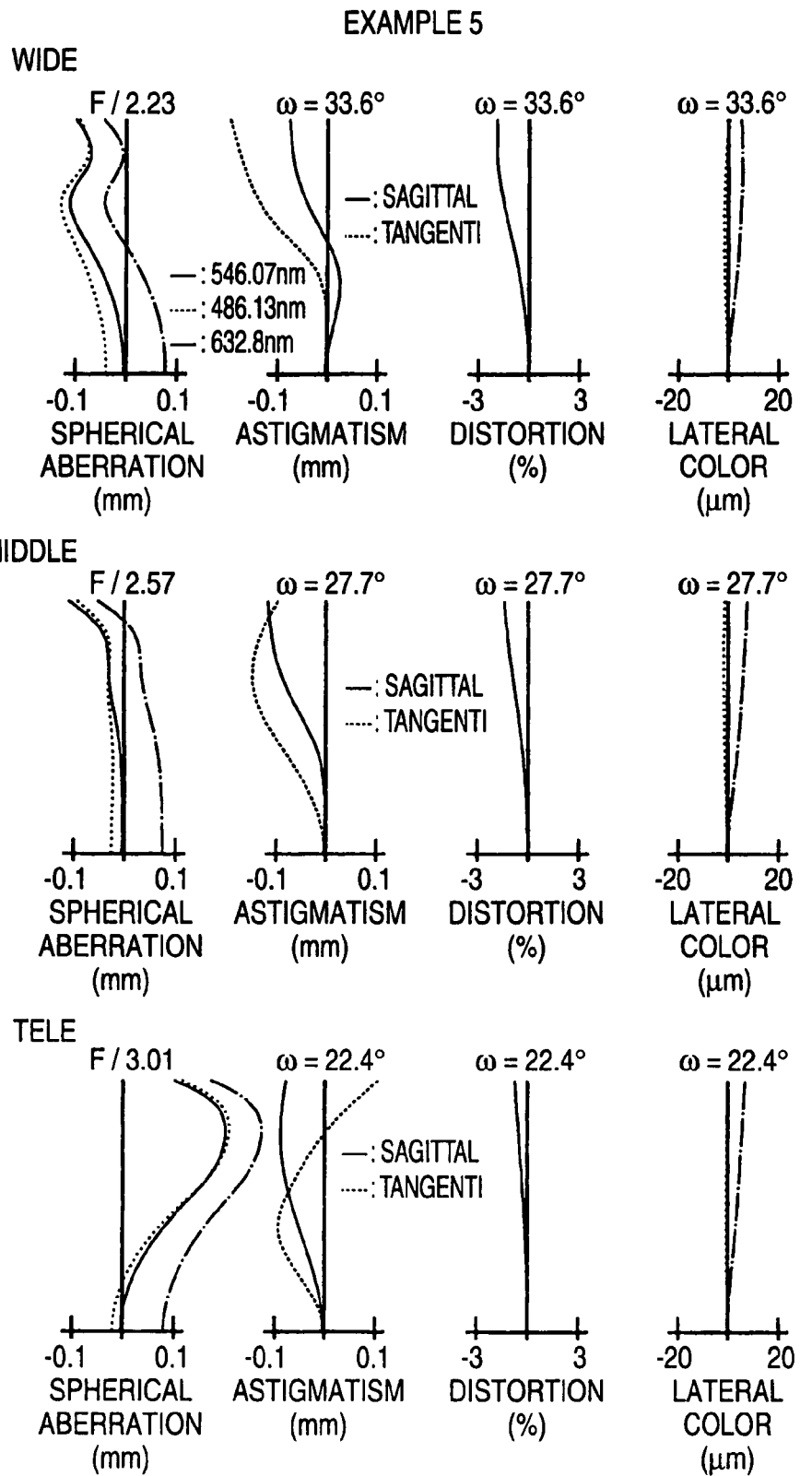
FIG. 29 is an aberration chart showing various aberrations (spherical aberration, astigmatism, distortion, and lateral color) of the projection zoom lens of the example 5.

In addition, FIG. 29 is an aberration chart showing the spherical aberration, the astigmatism, the distortion, and the lateral color of the projection zoom lens of the example 5. Here, the aberrations as to the sagittal image surface and the tangential image surface are shown in the astigmatism chart.

Figure 30:
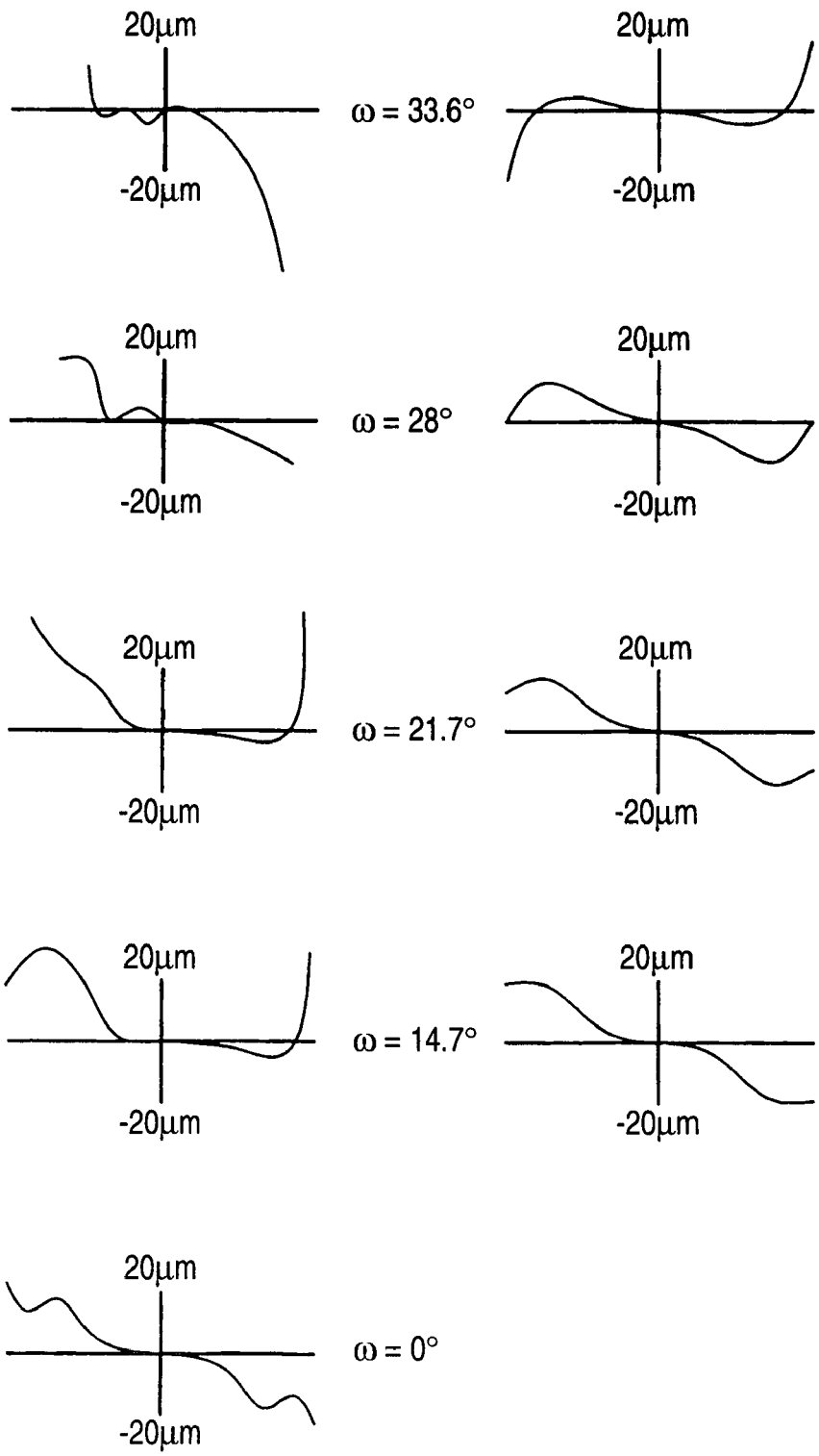
FIG. 30 is a chart of transverse aberrations of the projection zoom lens of the example 5 at the wavelength of 546.07 nm at a wide-angle end.
Figure 31:
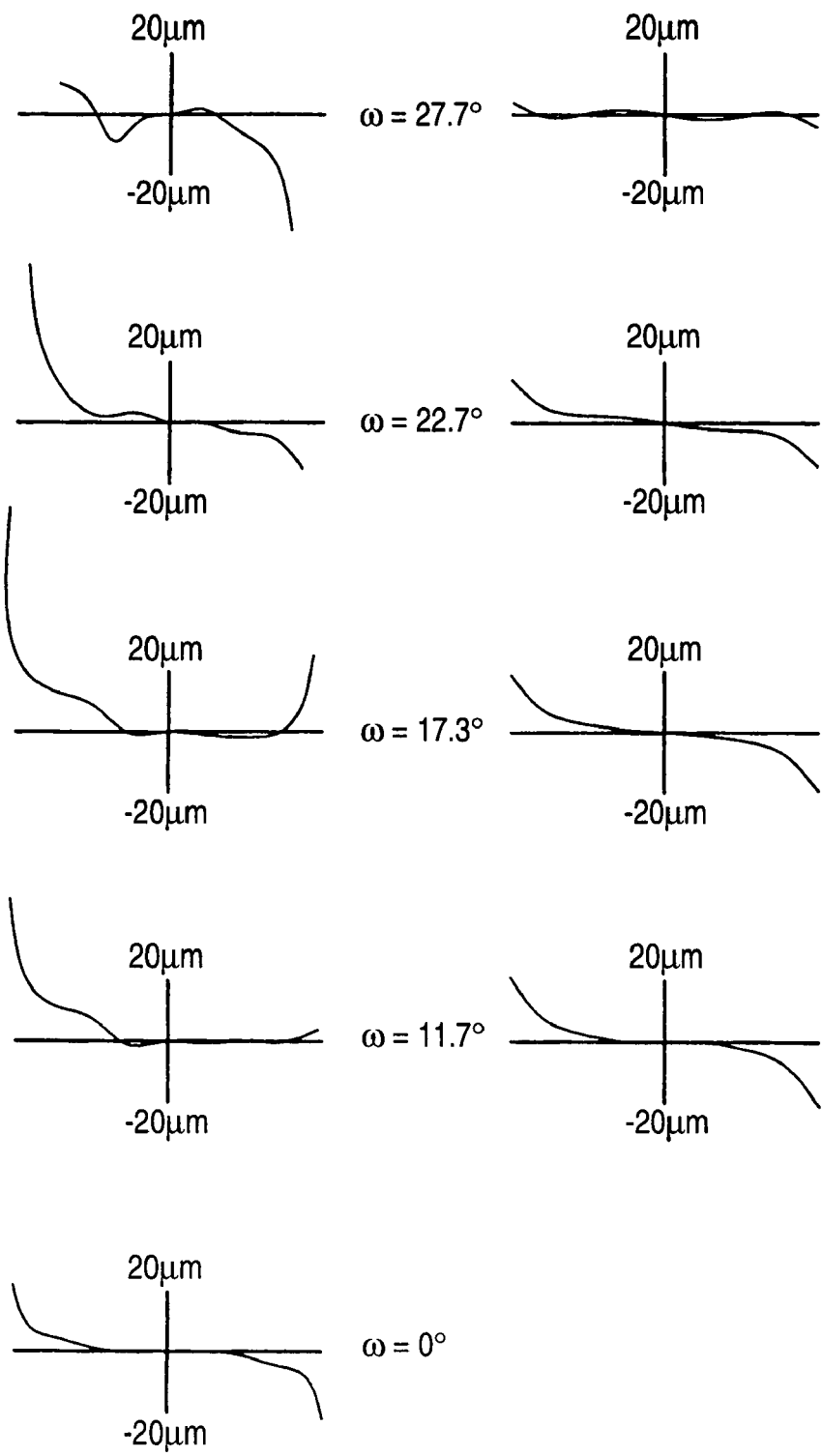
FIG. 31 is a chart of transverse aberrations of the projection zoom lens of the example 5 at the wavelength of 546.07 nm in a middle range.

Also, FIGS. 30 to 32 are transverse aberration charts at a wavelength of 546.07 nm at the wide-angle end, in the middle range, and at the telephoto end in Table 5, respectively.

As apparent from these aberration charts, the projection zoom lens of the example 5 can correct respective aberrations, especially the lateral color satisfactorily.

Also, the projection zoom lens of the example 5 can improve the variable power ratio up to almost 1.59 times close to 1.6 times while maintaining the good optical performance.

Example 6

Figure 11:
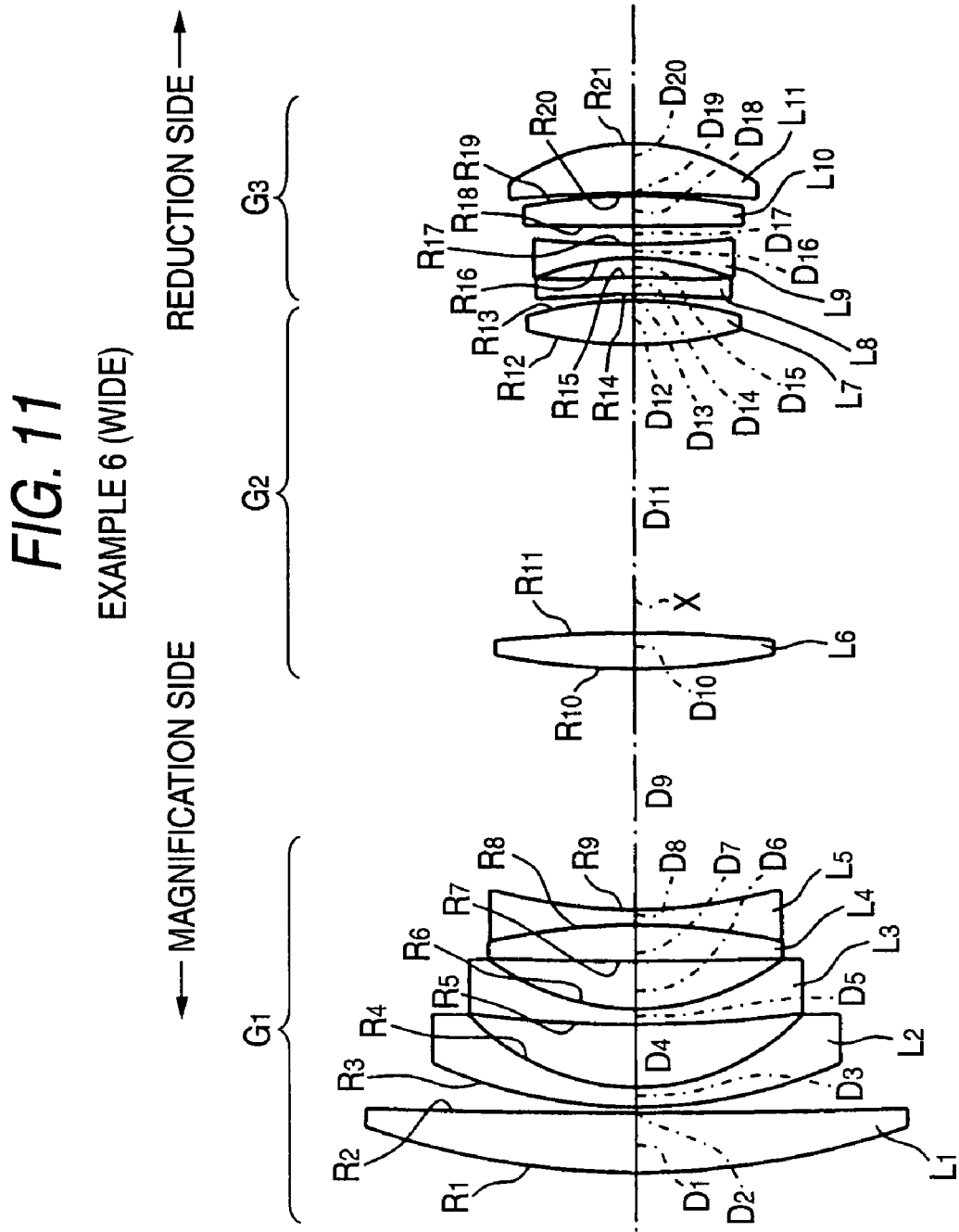
FIG. 11 is a schematic view showing a configuration of a projection zoom lens according to an example 6 of the invention.

FIG. 11 shows a schematic configuration of a projection zoom lens according to the example 6. In this example 6, description already made in the example 2 will be omitted.

A lens configuration of the projection zoom lens according to the example 6 is almost similar to that of the example 2.

Values of the radius of curvature R (mm) of the respective lens surfaces of this projection zoom lens, center thicknesses of the respective lenses and air distances D (mm) between the respective lenses, and the refractive indices N of the respective lenses with respect to d-line and the Abbe numbers νd of the respective lenses with respect to d-line are given in Table 6. Also, values of the focal length f (mm), the back focus Bfw (mm), the FNo, and the angle of view 2ω (degree) are given at the upper portion of Table 6.

TABLE 6 f = 16.76~21.17~26.73
Bfw = 36.01
Fno = 2.23~2.57~3.01
2ω = 67.4°~55.4°~44.8°

| Surface | R | D | Nd | νd |
|---|---|---|---|---|
| 1 | 72.372 | 5.25 | 1.51633 | 64.1 |
| 2 | 873.148 | 0.50 | | |
| 3 | 43.676 | 1.70 | 1.65160 | 58.5 |
| 4 | 19.977 | 5.51 | | |
| 5 | 109.312 | 1.40 | 1.74400 | 44.8 |
| 6 | 21.430 | 4.18 | | |
| 7 | 346.618 | 3.25 | 1.80518 | 25.4 |
| 8 | −56.143 | 1.30 | 1.58913 | 61.2 |
| 9 | 46.751 | 21.35~11.38~3.51 | | |
| 10 | 60.836 | 3.18 | 1.77250 | 49.6 |
| 11 | −113.865 | 25.28 | | |
| 12 | 35.376 | 3.94 | 1.58913 | 61.2 |
| 13 | −33.933 | 0.50~1.96~4.14 | | |
| *14 | −43.257 | 1.50 | 1.68893 | 31.1 |
| *15 | −52.660 | 1.67 | | |
| 16 | −22.770 | 1.20 | 1.78472 | 25.7 |
| 17 | 89.207 | 1.62 | | |
| 18 | 703.257 | 2.72 | 1.51633 | 64.1 |
| 19 | −48.434 | 0.20 | | |
| 20 | −114.971 | 4.41 | 1.58144 | 40.7 |
| 21 | −18.785 | 33.50~38.91~45.24 | | |
| 22 | ∞ | 3.00 | 1.48749 | 70.2 |
| | ∞ | | | |

*Aspheric surface coefficient

| | Surface number | |
|---|---|---|
| | 14 | 15 |
| K | −278.7129675 | −645.2737754 |
| $A_3$ | $1.2317539 \times 10^{-3}$ | $1.1904180 \times 10^{-3}$ |
| $A_4$ | $-1.3452430 \times 10^{-3}$ | $-1.4018855 \times 10^{-3}$ |
| $A_5$ | $4.3164533 \times 10^{-4}$ | $4.6506230 \times 10^{-4}$ |
| $A_6$ | $-5.7319367 \times 10^{-5}$ | $-5.6097833 \times 10^{-5}$ |
| $A_7$ | $1.5078908 \times 10^{-6}$ | $1.4859077 \times 10^{-7}$ |
| $A_8$ | $3.7941071 \times 10^{-7}$ | $3.9858107 \times 10^{-7}$ |
| $A_9$ | $-2.4323454 \times 10^{-8}$ | $1.6914337 \times 10^{-8}$ |
| $A_{10}$ | $-1.4471165 \times 10^{-9}$ | $-6.8339868 \times 10^{-9}$ |
| $A_{11}$ | $1.2155892 \times 10^{-10}$ | $3.3050449 \times 10^{-10}$ |

Also, the projection zoom lens of the example 6 satisfies all the conditional expressions (1) to (5) and the conditional expression (2′) as shown in Table 7.

Also, FIG. 12 shows a lens moving locus in the projection zoom lens according to the example 6 during the varying of the power.

In addition, FIG. 33 is an aberration chart showing the spherical aberration, the astigmatism, the distortion, and the lateral color of the projection zoom lens of the example 6. Here, the aberrations as to the sagittal image surface and the tangential image surface are shown in the astigmatism chart.

Figure 34:
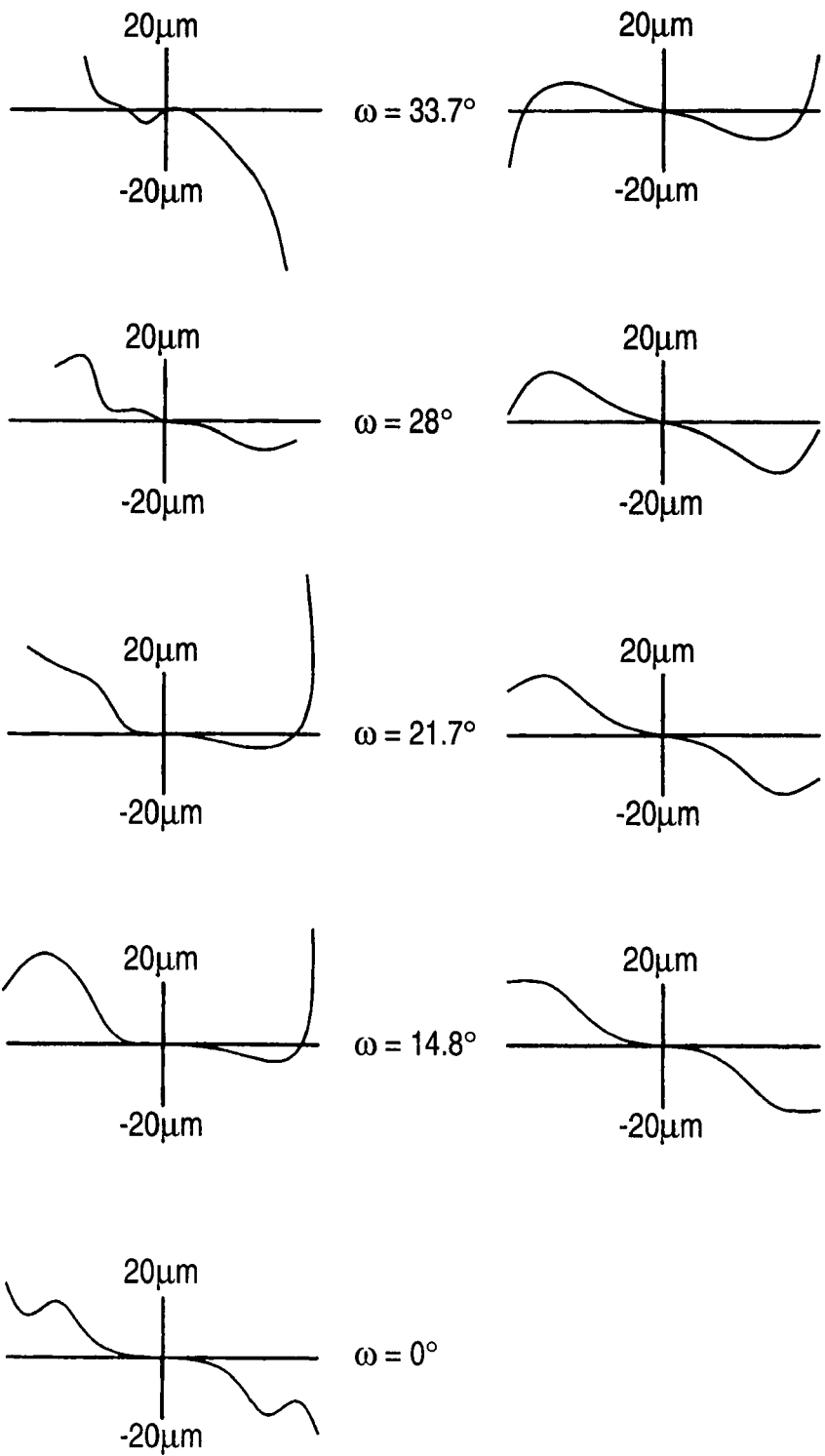
FIG. 34 is a chart of transverse aberrations of the projection zoom lens of the example 6 at the wavelength of 546.07 nm at a wide-angle end.

Also, FIGS. 34 to 36 are transverse aberration charts at a wavelength of 546.07 nm at the wide-angle end, in the middle range, and at the telephoto end in Table 6, respectively.

As apparent from these aberration charts, the projection zoom lens of the example 6 can correct the respective aberrations, especially the lateral color satisfactorily.

Also, the projection zoom lens of the example 6 can improve the variable power ratio up to almost 1.59 times close to 1.6 times while maintaining the good optical performance.

TABLE 7

|  | Example 1 | Example 2 | Example 3 | Example 4 | Example 5 | Example 6 |
|---|---|---|---|---|---|---|
| fW | 16.76 | 16.75 | 16.74 | 16.74 | 16.77 | 16.76 |
| fT | 26.74 | 26.71 | 26.70 | 26.70 | 26.75 | 26.73 |
| Bfw | 36.01 | 36.01 | 36.01 | 36.01 | 36.01 | 36.01 |
| M1 | 2.59 | 5.00 | 4.60 | 3.13 | 2.71 | 2.47 |
| M2 | −14.77 | −13.66 | −13.90 | −15.09 | −15.27 | −15.37 |
| M3 | −11.37 | −10.33 | −10.98 | −10.98 | −11.53 | −11.74 |
| f1 | −21.84 | −22.84 | −23.14 | −22.11 | −21.53 | −21.48 |
| f2 | 26.77 | 26.84 | 28.36 | 29.35 | 28.63 | 28.71 |
| f3 | 244.25 | 635.34 | −8698.78 | 391.82 | 754.89 | 748.80 |
| M1/f1 | −0.11859 | −0.21891 | −0.19857 | −0.14138 | −0.12587 | −0.11499 |
| M2/f2 | −0.55174 | −0.50894 | −0.49013 | −0.51414 | −0.53336 | −0.53535 |
| M3/f3 | −0.04655 | −0.01626 | 0.00126 | −0.02802 | −0.01527 | −0.01568 |
| (3) Nd | 1.77250 | 1.83481 | 1.83481 | 1.83481 | 1.77250 | 1.77250 |
| (4) vd | 49.6 | 42.7 | 42.7 | 42.7 | 49.6 | 49.6 |
| (5) Nd | 1.80610 | 1.84666 | 1.84666 | 1.78472 | 1.75520 | 1.78472 |

The reduction side in the optical axis direction is the positive direction of the movement amount of each lens group.

What is claimed is:

1. A projection zoom lens comprises in order from a magnification side:
   a first lens group having a negative refractive power;
   a second lens group having a positive refractive power; and
   a third lens group for an aberration correction, wherein:
   all the first to third lens groups are configured to be moving groups, respectively,
   the second lens group and the third lens group are configured to move to the magnification side during varying of a power of the zoom lens from a wide-angle end to a telephoto end, and
   the first to third lens groups satisfy:

$$|M3/f3| < |M1/f1| < |M2/f2| \qquad (1)$$

$$0.40 < |M2/f2| < 0.80 \qquad (2)$$

where
   Mi denotes a movement amount of the i-th lens group between the wide-angle end and the telephoto end during the varying of the power, and
   fi denotes a focal length of the i-th lens group.

2. The lens according to claim 1, wherein:
   the second lens group includes two or more positive lenses, and
   a refractive index Npd of a glass material constituting the positive lens disposed on a most magnification side among the two or more positive lenses with respect to d-line satisfies:

$$Npd > 1.70 \qquad (3).$$

3. The lens according to claim 2, wherein an Abbe number vpd of the glass material constituting the positive lens on the most magnification side among the two or more positive lenses with respect to the d-line satisfies:

$$vpd > 40 \qquad (4).$$

4. The lens according to claim 1, wherein:
   the third lens group includes at least one negative lens, and
   a refractive index Nnd of a glass material, which constitutes the negative lens having the largest refractive power among the at least one negative lens, with respect to d-line satisfies:

$$Nnd > 1.75 \qquad (5).$$

5. The lens according to claim 1, wherein a lens, which is disposed on a most reduction side of the third lens group, is a positive lens whose convex surface is directed to the reduction side.

6. The lens according to claim 2, wherein a lens, which is disposed on a most reduction side of the third lens group, is a positive lens whose convex surface is directed to the reduction side.

7. The lens according to claim 3, wherein a lens, which is disposed on a most reduction side of the third lens group, is a positive lens whose convex surface is directed to the reduction side.

8. The lens according to claim 4, wherein a lens, which is disposed on a most reduction side of the third lens group, is a positive lens whose convex surface is directed to the reduction side.

9. The lens according to claim 1, wherein at least one surface of one of the lenses of the third lens group is formed of an aspheric surface.

10. The lens according to claim 2, wherein at least one surface of one of the lenses of the third lens group is formed of an aspheric surface.

11. The lens according to claim 3, wherein at least one surface of one of the lenses of the third lens group is formed of an aspheric surface.

12. The lens according to claim 4, wherein at least one surface of one of the lenses of the third lens group is formed of an aspheric surface.

13. The lens according to claim 5, wherein at least one surface of one of the lenses of the third lens group is formed of an aspheric surface.

14. The lens according to claim 6, wherein at least one surface of one of the lenses of the third lens group is formed of an aspheric surface.

15. The lens according to claim 7, wherein at least one surface of one of the lenses of the third lens group is formed of an aspheric surface.

16. The lens according to claim 8, wherein at least one surface of one of the lenses of the third lens group is formed of an aspheric surface.

17. A projection display device comprising:
a light source;
a light valve;
an illumination optical portion that guides a luminous flux from the light source to the light valve; and
the projection zoom lens according to claim 1, wherein:
the light valve optically modulates the luminous flux from the light source, and
the projection zoom lens projects the modulated luminous flux onto a screen.

18. A projection display device comprising:
a light source;
a light valve;
an illumination optical portion that guides a luminous flux from the light source to the light valve; and
the projection zoom lens according to claim 2, wherein:
the light valve optically modulates the luminous flux from the light source, and
the projection zoom lens projects the modulated luminous flux onto a screen.

19. A projection display device comprising:
a light source;
a light valve;
an illumination optical portion that guides a luminous flux from the light source to the light valve; and
the projection zoom lens according to claim 3, wherein:
the light valve optically modulates the luminous flux from the light source, and
the projection zoom lens projects the modulated luminous flux onto a screen.

20. A projection display device comprising:
a light source;
a light valve;
an illumination optical portion that guides a luminous flux from the light source to the light valve; and
the projection zoom lens according to claim 4, wherein:
the light valve optically modulates the luminous flux from the light source, and
the projection zoom lens projects the modulated luminous flux onto a screen.

* * * * *